United States Patent
Ogawa et al.

(10) Patent No.: US 8,086,385 B2
(45) Date of Patent: Dec. 27, 2011

(54) CONTROL APPARATUS FOR INTERNAL COMBUSTION ENGINE

(75) Inventors: Takashi Ogawa, Susono (JP); Tomoyuki Kogo, Gotenba (JP); Kazuyasu Iwata, Susono (JP); Katsuhiro Ito, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 182 days.

(21) Appl. No.: 12/674,330

(22) PCT Filed: Feb. 13, 2009

(86) PCT No.: PCT/JP2009/052405
§ 371 (c)(1), (2), (4) Date: Feb. 19, 2010

(87) PCT Pub. No.: WO2010/092678
PCT Pub. Date: Aug. 19, 2010

(65) Prior Publication Data
US 2011/0054760 A1   Mar. 3, 2011

(51) Int. Cl.
*F01L 1/344* (2006.01)
*F02B 29/08* (2006.01)

(52) U.S. Cl. ........................ 701/102; 123/90.17

(58) Field of Classification Search .............. 701/102; 123/90.11, 90.15, 90.17, 65 E, 65 V, 188.1; 477/107, 109
See application file for complete search history.

(56) References Cited

U.S. PATENT DOCUMENTS

| 5,133,309 A * | 7/1992 | Ishii .............................. 123/65 V |
| 6,352,061 B2* | 3/2002 | Takahashi ................... 123/90.15 |
| 7,051,687 B2* | 5/2006 | Shimizu et al. ............. 123/90.11 |

FOREIGN PATENT DOCUMENTS

| JP | 06108858 A * | 4/1994 |
| JP | A-6-173723 | 6/1994 |
| JP | A-10-318001 | 12/1998 |
| JP | A-11-22499 | 1/1999 |
| JP | A-11-82074 | 3/1999 |
| JP | A-2001-3757 | 1/2001 |
| JP | A-2003-3871 | 1/2003 |
| JP | A-2004-190514 | 7/2004 |

OTHER PUBLICATIONS

International Search Report mailed on Mar. 17, 2009 in corresponding International Application No. PCT/JP2009/052405 (with translation).

* cited by examiner

*Primary Examiner* — Hieu T Vo
(74) *Attorney, Agent, or Firm* — Oliff & Berridge, PLC

(57) ABSTRACT

To provide a control apparatus for an internal combustion engine which can effectively utilize a scavenging effect while suppressing a torque difference in the internal combustion engine provided with a variable valve mechanism which makes a valve overlap period variable.

When a scavenging effect utilization condition that the scavenging effect using exhaust pressure pulsation can be effectively utilized is established, a valve overlap period is set so as to overlap with a timing at which a trough of the exhaust pressure pulsation comes. In this occasion, a set value of the valve overlap period is limited such that an increase amount of a torque index value associated with the setting of valve overlap period does not exceed a predetermined permissible value.

9 Claims, 10 Drawing Sheets

CONTROL APPARATUS FOR INTERNAL COMBUSTION ENGINE

TECHNICAL FIELD

The present invention relates to a control apparatus for an internal combustion engine including a variable valve mechanism which makes variable a valve overlap period in which an intake valve open period overlaps with an exhaust valve open period.

BACKGROUND ART

So far, for example, Patent Document 1 discloses a valve timing control apparatus of an internal combustion engine which includes a variable valve mechanism that makes variable a valve overlap period, during which an intake valve open period overlaps with an exhaust valve open period, by changing the valve timing of at least one of the intake and exhaust valves. In this conventional control apparatus, arrangement is made such that the valve timing of intake and exhaust valve is changed such that an exhaust-port arrival timing of a negative pressure wave caused by exhaust pressure pulsation coincides with the valve overlap period of the intake and exhaust valves. According to such control, it becomes possible to make fresh air easily flow into a cylinder from the intake valve and to expel the burnt gas in the cylinder securely using the air that flowed in through the intake valve. That is, a scavenging effect can be achieved. As a result, the quantity of residual gas is reduced and the quantity of fresh air to be taken into a cylinder can be increased. That is, volumetric efficiency can be improved.

[Patent Document 1] Japanese Laid-open Patent Application Publication No. Hei 11-022499

DISCLOSURE OF THE INVENTION

Problems to be Solved by the Invention

Meanwhile, in a situation in which the quantity of intake air is rather small, such as in an initial period of acceleration of a vehicle, a relatively weak exhaust pressure pulsation is generated. As a result, enough scavenging effect cannot be utilized. Therefore, one possible idea would be to set a valve overlap period to achieve a scavenging effect after the exhaust pressure pulsation has grown sufficiently strong. However, there is a possibility that a torque difference may occur with a rapid increase of fresh air quantity (or torque) associated with the scavenging effect.

The present invention, which has been made to solve the above described problems, has an object to provide a control apparatus for an internal combustion engine, which can effectively utilize a scavenging effect while suppressing the occurrence of a torque difference in the internal combustion engine which includes a variable valve mechanism which makes a valve overlap period variable.

Means for Solving the Problem

A first aspect of the present invention is a control apparatus for an internal combustion engine, the control apparatus comprising:

a variable valve mechanism which makes variable a valve overlap period in which an intake valve open period overlaps with an exhaust valve open period;

scavenging effect determination means for determining whether or not a scavenging effect utilization condition in which a scavenging effect using an exhaust pressure pulsation can be effectively utilized is established; and overlap period setting means which controls the variable valve mechanism to set a valve overlap period so as to overlap with a timing at which a trough of the exhaust pressure pulsation comes, after the scavenging effect utilization condition is established;

wherein the overlap period setting means includes overlap period limiting means which limits a set value of the valve overlap period such that an increase amount of a torque index value associated with the setting of the valve overlap period does not exceed a predetermined permissible value.

A second aspect of the present invention is the control apparatus for the internal combustion engine according to the first aspect of the present invention, the control apparatus further comprising:

pulsation waveform acquisition means for acquiring pulsation waveform information on at least the exhaust pressure pulsation of the exhaust pressure pulsation and an intake pressure pulsation;

wherein the overlap period limiting means includes valve control decision means which decides which of the intake valve opening timing and the exhaust valve closing timing is to be adjusted based on the pulsation waveform information, when limiting the set value of the valve overlap period.

A third aspect of the present invention is the control apparatus for the internal combustion engine according to the second aspect of the present invention, wherein the valve control decision means decides to adjust the intake valve opening timing when limiting the set value of the valve overlap period, if an area in which intake pressure is higher than exhaust pressure lies more to a front side of an intake/exhaust top dead center.

A fourth aspect of the present invention is the control apparatus for the internal combustion engine according to the second aspect of the present invention, wherein the valve control decision means decides to adjust the exhaust valve closing timing when limiting the set value of the valve overlap period, if an area in which intake pressure is higher than exhaust pressure lies more to a rear side of an intake/exhaust top dead center.

A fifth aspect of the present invention is the control apparatus for the internal combustion engine according to the second aspect of the present invention, wherein the variable valve mechanism includes an intake variable valve mechanism which makes the intake valve opening timing variable while making an operating angle fixed or variable, and an exhaust variable valve mechanism which makes the exhaust valve closing timing variable while making the operating angle fixed; and wherein the valve control decision means decides to adjust the intake valve opening timing when limiting the set value of the valve overlap period, if an area in which intake pressure is higher than exhaust pressure lies substantially uniformly in a front and rear sides of an intake/exhaust top dead center.

A sixth aspect of the present invention is the control apparatus for the internal combustion engine according to the second aspect of the present invention, wherein the variable valve mechanism includes an intake variable valve mechanism which makes the intake valve opening timing variable while making an operating angle fixed, and an exhaust variable valve mechanism which makes the exhaust valve closing timing variable while making the operating angle variable; and wherein the valve control decision means decides to adjust the exhaust valve closing timing when limiting the set value of the valve overlap period, when an area in which intake pressure is higher than exhaust pressure lies substantially uniformly in a front and rear sides of an intake/exhaust top dead center.

A seventh aspect of the present invention is the control apparatus for the internal combustion engine according to the second aspect of the present invention, wherein the variable valve mechanism includes an intake variable valve mechanism which makes the intake valve opening timing variable while making an operating angle and a lift angle variable, and an exhaust variable valve mechanism which makes the exhaust valve closing timing variable while making the operating angle variable; and wherein the valve control decision means decides to adjust the exhaust valve closing timing when limiting the set value of the valve overlap period, if an area in which intake pressure is higher than exhaust pressure lies substantially uniformly in a front and rear sides of an intake/exhaust top dead center.

An eighth aspect of the present invention is the control apparatus for the internal combustion engine according to any one of the first to the seventh aspects of the present invention, acceleration request detection means for detecting existence or nonexistence of an acceleration request for the internal combustion engine;

a turbocharger which includes: a turbine which is driven by exhaust energy of internal combustion engine; and a variable nozzle which adjusts a flow rate of exhaust gas supplied to the turbine;

nozzle opening degree control means for controlling an opening degree of the variable nozzle;

pulsation generation state acquisition means for acquiring a judgment time point at which exhaust pressure pulsation is judged to have been enhanced, or a prediction time point at which exhaust pressure pulsation is predicted to be enhanced; and overlap period reduction means for controlling the value overlap period to be shorter than the valve overlap period at the detection time point, for a duration from the detection time point to the judgment time point or the prediction time point;

wherein the nozzle opening degree control means includes nozzle closing control execution means for controlling the opening degree of the variable nozzle to be a predetermined opening degree which is on a closing side with respect to the opening degree of the variable nozzle at a detection time point, at which the acceleration request is detected, for the duration from the detection time point to the judgment time point or the prediction time point.

ADVANTAGES OF THE INVENTION

According to the first aspect of the present invention, when the scavenging effect utilization condition is established, the set value of the valve overlap period is limited such that the increase amount of the torque index value associated with the setting of the valve overlap period is not excessive. As a result of this, it becomes possible to effectively utilize the scavenging effect while suppressing a torque difference when the valve overlap period is set.

When the pulsation waveform differs, the effect of the adjustment of the valve overlap period on the torque index value varies depending on whether the valve overlap period is adjusted by the adjustment of the intake valve opening timing or by the adjustment of the exhaust valve closing timing. According to the second aspect of the present invention, it is determined, depending on the pulsation waveform, which of the intake valve opening timing and the exhaust valve closing timing is adjusted when the set value of the valve overlap period is limited. As a result of this, it becomes possible to improve the controllability of the torque index value when limiting the set value of the valve overlap period. Thus, it becomes possible to further reduce the torque difference.

According to the third or fourth aspect of the present invention, either one of the valve controls, which is more excellent in the controllability of the torque index value against the adjustment of the valve overlap period, can be selected so that the change of the torque index value against the adjustment of the valve overlap period becomes more gradual.

When the area, in which the intake pressure is higher than the exhaust pressure, lies uniformly in the front and rear sides of the intake/exhaust top dead center in a pulsation waveform, the phase change of the exhaust pressure pulsation caused by the change of the opening timing of the exhaust valve associated with a change of the closing timing thereof has more effects on the change of the fresh air quantity than the change of the closing timing of the intake valve associated with a change of the opening timing thereof. According to the fifth aspect of the present invention, when provided with an intake variable valve mechanism which makes the intake valve opening timing variable while making an operating angle fixed or variable, and an exhaust variable valve mechanism which makes the exhaust valve closing timing variable while making the operating angle fixed, the limitation of the set value of the valve overlap period is to be performed by the adjustment of the intake valve opening timing. As a result, it becomes possible to make the change of the torque index value against the adjustment of the valve overlap period more gradual.

When an exhaust variable valve mechanism which makes the exhaust valve closing timing variable while making the operating angle variable is provided, it becomes possible to adjust the exhaust valve closing timing while keeping the exhaust valve opening timing constant. As a result of this, it becomes possible to prevent the change of the fresh air quantity caused by the change of exhaust pressure pulsation associated with a change of the opening timing. Further, since the adjustment of the valve overlap period is not performed on the intake side, it is possible to prevent the change of the fresh air quantity associated with a change of the intake valve opening and closing timing. As a result of this, according to the sixth aspect of the present invention, when the above described exhaust variable valve mechanism is provided, and when the area, in which the intake pressure is higher than the exhaust pressure, lies uniformly in the front and rear sides of the intake/exhaust top dead center, it becomes possible to make the change of torque index value against the adjustment of the valve overlap period more gradual.

When an intake variable valve mechanism which makes the intake valve opening timing variable while making the operating angle as well as a lift amount variable is provided, it cannot be avoided that a change of the lift amount of the intake valve occurs when the intake valve opening timing is adjusted while the intake valve closing timing being kept constant. Moreover, even if an operating angle variable mechanism in which an exhaust variable valve mechanism involves a change in the lift amount is provided, the effect of the change of the lift amount of the intake valve on the fresh air quantity becomes larger than the effect of the change of the lift amount of the exhaust valve on the fresh air quantity. According to the seventh aspect of the present invention, when the above described intake variable valve mechanism as well as an exhaust variable valve mechanism, which makes the exhaust valve closing timing variable while making the operating angle variable, is provided and when the area in which the intake pressure is higher than the exhaust pressure lies uniformly in the front and rear sides of the intake/exhaust top dead center in a pulsation waveform, it becomes possible to make the change of the torque index value against the adjustment of the valve overlap period more gradual.

According to the eighth aspect of the present invention, it becomes possible to effectively utilize the scavenging effect at an early period during an acceleration request while suppressing a torque difference in the beginning of the utilization of the scavenging effect.

Figure 1:
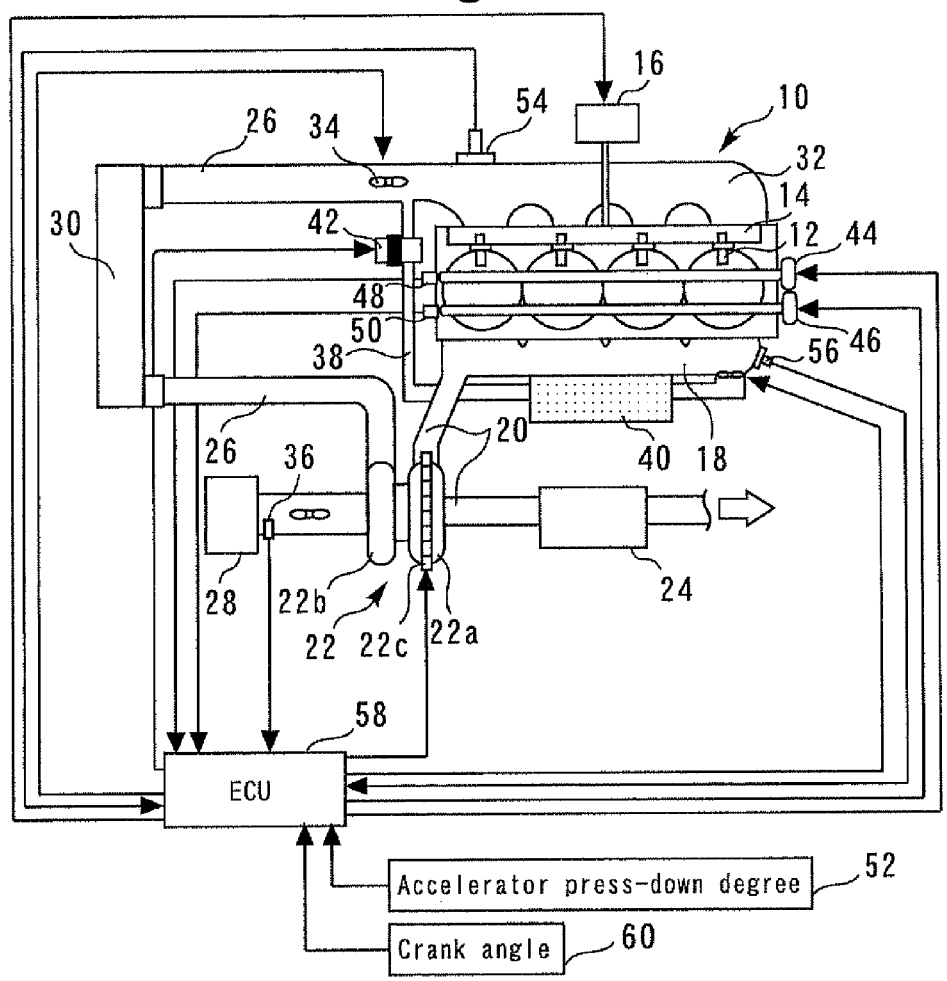
FIG. 1 is a diagram for explaining a system configuration of a first embodiment of the present invention.

DESCRIPTION OF SYMBOLS 10 diesel engine
12 injector
18 exhaust manifold
20 exhaust passage
22 turbocharger
22a turbine
22b compressor
22c variable nozzle
26 intake passage
32 intake manifold
36 airflow meter
44 intake variable valve mechanism
46 exhaust variable valve mechanism
52 accelerator press-down degree sensor
54 intake pressure sensor
56 exhaust pressure sensor
58 ECU (Electronic Control Unit)
60 crank angle sensor

BEST MODE FOR CARRYING OUT THE INVENTION

First Embodiment

[System Configuration of First Embodiment]

FIG. 1 is a diagram for explaining a system configuration of a first embodiment of the present invention. The system shown in FIG. 1 includes a 4-cycle diesel engine (compression ignition internal combustion engine) 10. It is assumed that the diesel engine 10 is mounted in a vehicle and works as its power source. Although the diesel engine 10 of the present embodiment is of an in-line 4 cylinder type, the number and arrangement of cylinders in the diesel engine in the present invention is not limited to the foregoing.

An injector 12 directly injecting fuel into the cylinder is installed in each cylinder of the diesel engine 10. The injector 12 of each cylinder is connected to a common common-rail 14. In the common-rail 14, a high pressure fuel which is pressurized by a supply pump 16 is stored. Then, from this common-rail 14, the fuel is supplied to the injector 12 of each cylinder. The exhaust gas discharged from each cylinder is collected by an exhaust manifold 18 to flow into an exhaust passage 20.

The diesel engine 10 includes a variable nozzle type turbocharger 22. The turbocharger 22 includes a turbine 22a which is operated by the exhaust energy of exhaust gas, and a compressor 22b which is integrally coupled to the turbine 22a and is driven to rotate by the exhaust energy of the exhaust gas input to the turbine 22a. Further, the turbocharger 22 includes a variable nozzle (VN) 22c for adjusting the flow rate of the exhaust gas supplied to the turbine 22a.

The variable nozzle 22c can perform a switching action by means of an actuator (for example, an electric motor) which is not shown. Decreasing the opening degree of the variable nozzle 22c reduces the inlet area of the turbine 22a, thereby allowing the flow speed of the exhaust gas, which is to be blown against the turbine 22a, to be increased. As a result, the rotational speed of the compressor 22b and turbine 22a (hereafter referred to as a "turbo rotational speed") increases, and thus the boost pressure can be increased. On the contrary, increasing the opening degree of the variable nozzle 22c increases the inlet area of the turbine 22a, thereby decreasing the flow speed of the exhaust gas to be blown against the turbine 22a. As a result, since the turbo rotational speed decreases, the boost pressure can be decreased.

The turbine 22a of the turbocharger 22 is disposed in the middle of the exhaust passage 20. A DPF 24 for trapping Particulate Matter (PM) in the exhaust gas is installed at a downstream side of the turbine 22a in the exhaust passage 20. Note that besides the DPF 24, a catalyst for purifying hazardous components in the exhaust gas may be installed in the exhaust passage 20. Alternatively, catalytic components may be supported by the DPF 24.

An air cleaner 28 is provided in the vicinity of the inlet of an intake passage 26 of the diesel engine 10. The air suctioned through the air cleaner 28 is compressed by the compressor 22b of the turbocharger 22 and thereafter is cooled by an intercooler 30. The suctioned air which has passed through the intercooler 30 is distributed by an intake manifold 32 to flow into each cylinder.

An intake throttle valve 34 is installed in the intake passage 26 between the intercooler 30 and the intake manifold 32. Moreover, an airflow meter 36 for detecting the quantity of intake air is installed near the downstream of the air cleaner 28 in the intake passage 26.

One end of an EGR passage 38 is connected to the vicinity of the intake manifold 32. The other end of the EGR passage 38 is connected to the exhaust manifold 18 of the exhaust passage 20. In the present system, part of the exhaust gas (burnt gas) can be recirculated to the intake passage 26 through the EGR passage 38, that is, external EGR (Exhaust Gas Recirculation) can be performed.

In the middle of the EGR passage 38, an EGR cooler 40 is provided for cooling the exhaust gas (EGR gas) which passes through the EGR passage 38. An EGR valve 42 is provided at the downstream of the EGR cooler 40 in the EGR passage 38. By changing the opening degree of the EGR valve 42, the quantity of exhaust gas which passes through the EGR passage 38, that is, the quantity of external EGR gas can be adjusted.

Moreover, the diesel engine 10 includes an intake variable valve mechanism 44 which makes valve opening characteristics of an intake valve (not shown) variable, and an exhaust variable valve mechanism 46 which makes the opening characteristics of an exhaust valve (not shown) variable. More specifically, it is assumed that these variable valve mechanisms 44 and 46 are a phase variable mechanism (VVT mechanism) which makes an opening and closing timing of the intake valve and exhaust valve while fixing an operating angle thereof, by changing a rotation phase of a camshaft with respect to a rotation phase of a crankshaft. According to such intake variable valve mechanism 44 and exhaust variable valve mechanism 46, the length of a valve overlap period in which an open period of the exhaust valve and an open period of the intake valve overlaps with each other (hereafter, simply referred to as a "valve overlap period") can be changed.

Moreover, an intake cam angle sensor 48 and an exhaust cam angle sensor 50, which detects the rotation angle of each camshaft, that is, an intake cam angle and an exhaust cam angle, are disposed respectively in the vicinity of the intake camshaft and the exhaust camshaft.

Moreover, the system of the present embodiment further includes an accelerator press-down degree sensor 52 which detects a depression amount of an accelerator pedal (an accelerator press-down degree) of the vehicle equipped with the diesel engine 10, an intake pressure sensor 54 for detecting an intake manifold pressure (intake pressure), an exhaust pressure sensor 56 for detecting an exhaust manifold pressure (exhaust pressure), and an ECU (Electronic Control Unit) 58.

Moreover, the ECU 58 is connected with a crank angle sensor 60 for detecting a crank angle as well as the various sensors and actuators described above. The ECU 58 can also calculate an engine speed based on a detection signal of the crank angle sensor 60. Further, the ECU 58 can calculate advance angle quantities of the opening and closing timing of the intake valve and the exhaust valve based on detection signals of the above-described cam angle sensors 48 and 50. The ECU 58 controls the operating state of the diesel engine 10 by actuating each actuator according to predetermined programs based on the output of each sensor.

[Volumetric Efficiency Improvement Control by Utilization of Exhaust Pressure Pulsation]

Figure 2:
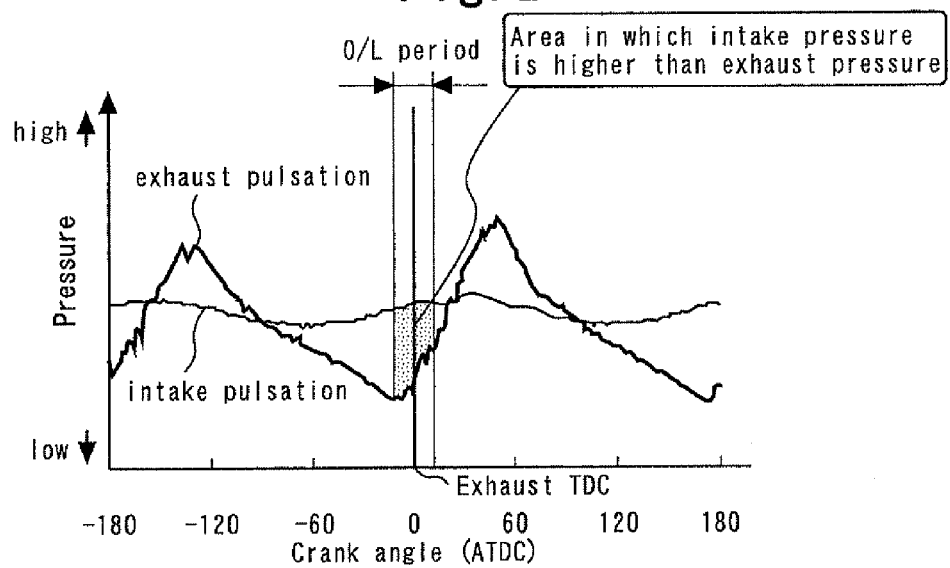
FIG. 2 is a diagram showing a relation of the intake manifold pressure and the exhaust manifold pressure with respect to the crank angle while the volumetric efficiency improvement control is being executed.

Being provided with the above-described intake variable valve mechanism 44 and the exhaust variable valve mechanism 46, the system of the present embodiment can arbitrarily adjust the valve overlap period. As a result of this, in the system of the present embodiment, a volumetric efficiency improvement control which improves the volumetric efficiency $\eta v$ (in cylinder air quantity) of the diesel engine 10 by utilizing pulsation of the exhaust manifold pressure in a predetermined operating range (for example, a low speed and high load range) can be executed. FIG. 2 is a diagram showing a relation of the intake manifold pressure and the exhaust manifold pressure with respect to the crank angle while the volumetric efficiency improvement control is being executed.

As shown in FIG. 2, the intake manifold pressure stays at a substantially constant pressure regardless of the crank angle. In contrast to this, the exhaust manifold pressure widely pulsates (periodically varies) as the exhaust gas is intermittently discharged through the exhaust valve of each cylinder. To be more specific, as the exhaust valve opening timing EVO retards, the timing at which the exhaust gas is released into the exhaust manifold 18 retards, and the waveform of the exhaust manifold pressure pulsation shifts to the right side in FIG. 2. That is, changing the exhaust valve opening timing EVO causes the waveform of the exhaust manifold pressure pulsation to move from side to side in FIG. 2. Moreover, the waveform of the exhaust manifold pressure pulsation is also caused to change by the occurrence of a change in the flow speed of the exhaust gas flowing in the exhaust manifold associated with a change in the engine speed.

The waveforms shown in FIG. 2 indicate a state in which the exhaust valve opening timing is controlled taking into consideration the relationship with engine rotational speed such that a trough part of the exhaust manifold pressure pulsation coincides with the valve overlap period (O/L period) which is present near the exhaust top dead center (TDC). Moreover, the waveforms shown in FIG. 2 indicate a state in which the intake pressure (boost pressure) is increased with respect to the exhaust pressure as a result of supercharging being performed at a state in which turbo efficiency is high. In such a state, the area represented by applying a hatch pattern in FIG. 2, that is, an area in which the intake pressure is higher than the exhaust pressure in the valve overlap period, is sufficiently ensured. As a result, the inflow of fresh air into the cylinder is facilitated and the effect of quickly expelling the burnt gas in the cylinder to the exhaust port by the inflow fresh air (so called, a scavenging effect) can be sufficiently achieved.

The scavenging effect as described above increases with the increase of the area represented by applying a hatch pattern in FIG. 2. Therefore, if the adjustment of the valve overlap period, which is based on the adjustment of the intake valve opening timing by use of the intake variable valve mechanism 44 and the adjustment of the exhaust valve closing timing by use of the exhaust variable valve mechanism 46, is performed to secure this area more widely, it becomes possible to achieve an enough scavenging effect. In this way, by performing the volumetric efficiency improvement control which utilizes the scavenging effect, it is made possible to sufficiently reduce the quantity of residual gas and thereby increase, by an equivalent amount, the quantity of fresh air to be charged into the cylinder. That is, the volumetric efficiency (charging efficiency) ηv can be increased. As a result, the torque of the diesel engine 10 can be well improved.

[Preferable Control Order when Applying Volumetric Efficiency Improvement Control to a System Including a Variable Nozzle Type Turbocharger]

Figure 3:
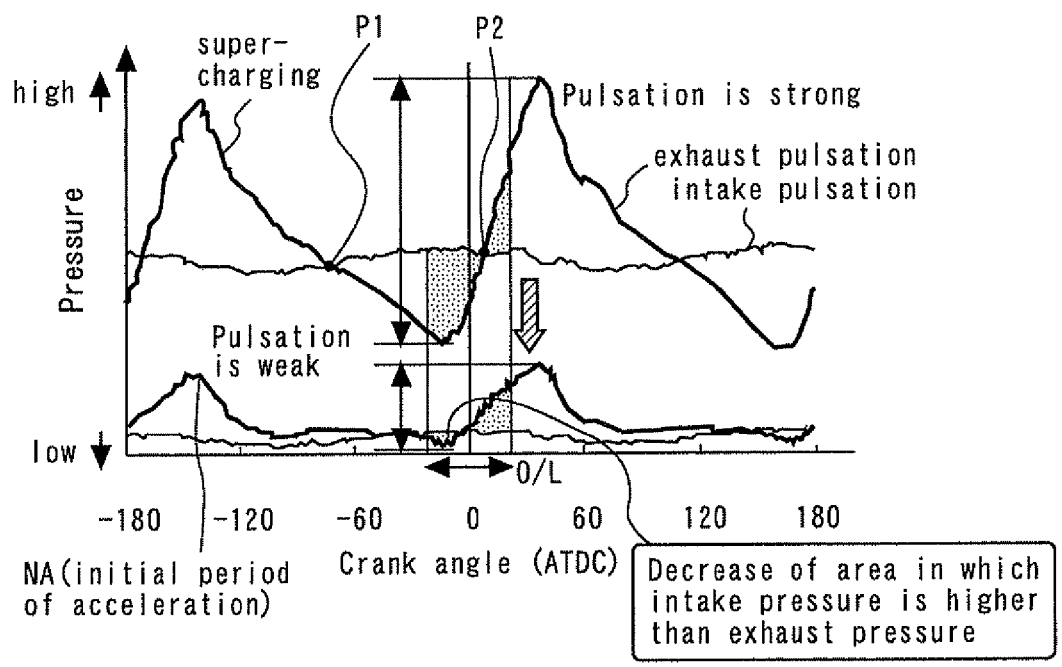
FIG. 3 is a diagram for explaining the effect of the strength of the exhaust pressure pulsation on the above-described volumetric efficiency improvement control.

FIG. 3 is a diagram for explaining the effect of the strength of the exhaust pressure pulsation on the above-described volumetric efficiency improvement control.

FIG. 3 shows a case in which the quantity of intake air is small (in other words, engine load is low) and no exhaust pressure pulsation of a sufficient strength is generated, such as in an initial period of acceleration. Moreover, FIG. 3 shows a case in which the quantity of intake air has increased (in other words, engine load has become high) and a sufficiently strong exhaust pressure pulsation is generated, and in which as a result of the turbocharger 22 being used in a state of a high turbo efficiency, the intake pressure is favorably increased relative to the exhaust pressure. To be more specific, as the load of the diesel engine 10 increases attended with a supercharging as a result of a request being made for shifting from an operating condition of a weak exhaust pressure pulsation such as an initial period of acceleration as shown by a waveform of lower side in FIG. 3 to a high load condition; the exhaust pressure pulsation is enhanced as well as the intake pressure (boost pressure) is favorably increased relative to the exhaust pressure as shown by the waveform shown on the upper side in FIG. 3.

As shown by the waveform on the lower side in FIG. 3, in a state in which the exhaust pressure pulsation is weak (the amplitude of the pulsation is small), the area in which the intake pressure is higher than the exhaust pressure is decreased in the vicinity of the exhaust top dead center in which the valve overlap period is provided. Because of this, in this case, the scavenging effect is decreased, thereby making it impossible to achieve a satisfactory effect offered by the above-described volumetric efficiency improvement control.

The system of the present embodiment, as already described, includes the variable nozzle type turbocharger 22. In a conventional internal combustion engine equipped with such a turbocharger, a control is performed such that in order to rapidly increase the torque of the internal combustion engine at the time of acceleration, the opening degree of the variable nozzle is controlled so as to be nearly fully closed to increase the boost pressure, thereby increasing the quantity of intake air. However, the system of the present embodiment includes the variable valve mechanisms 44 and 46 which make the valve overlap period adjustable, as well as such variable nozzle type turbocharger 22.

In the system of the present embodiment having the configuration as described above, if the valve overlap period is provided in a state in which the opening degree of the variable nozzle 22c is controlled so as to be nearly fully closed at the time of acceleration, a sufficient scavenging effect as described above cannot not be achieved since the exhaust pressure pulsation is weak in an initial period of acceleration.

Moreover, at the time of acceleration, if the valve overlap period is provided in a state in which the opening degree of the variable nozzle 22c is controlled so as to be nearly fully closed, as a result of the opening degree of the variable nozzle 22c being controlled so as to be nearly fully closed, exhaust pressure is caused to increase during acceleration, thereby making it harder to achieve the scavenging effect; and as a result of the valve overlap period being provided, a blow-back of the exhaust gas to the intake port side occurs. As a result, compared with a case in which the opening degree of the variable nozzle 22c is controlled so as to be nearly fully closed and the valve overlap period is not provided at the time of acceleration, the volumetric efficiency ηv is degraded.

Figure 4:
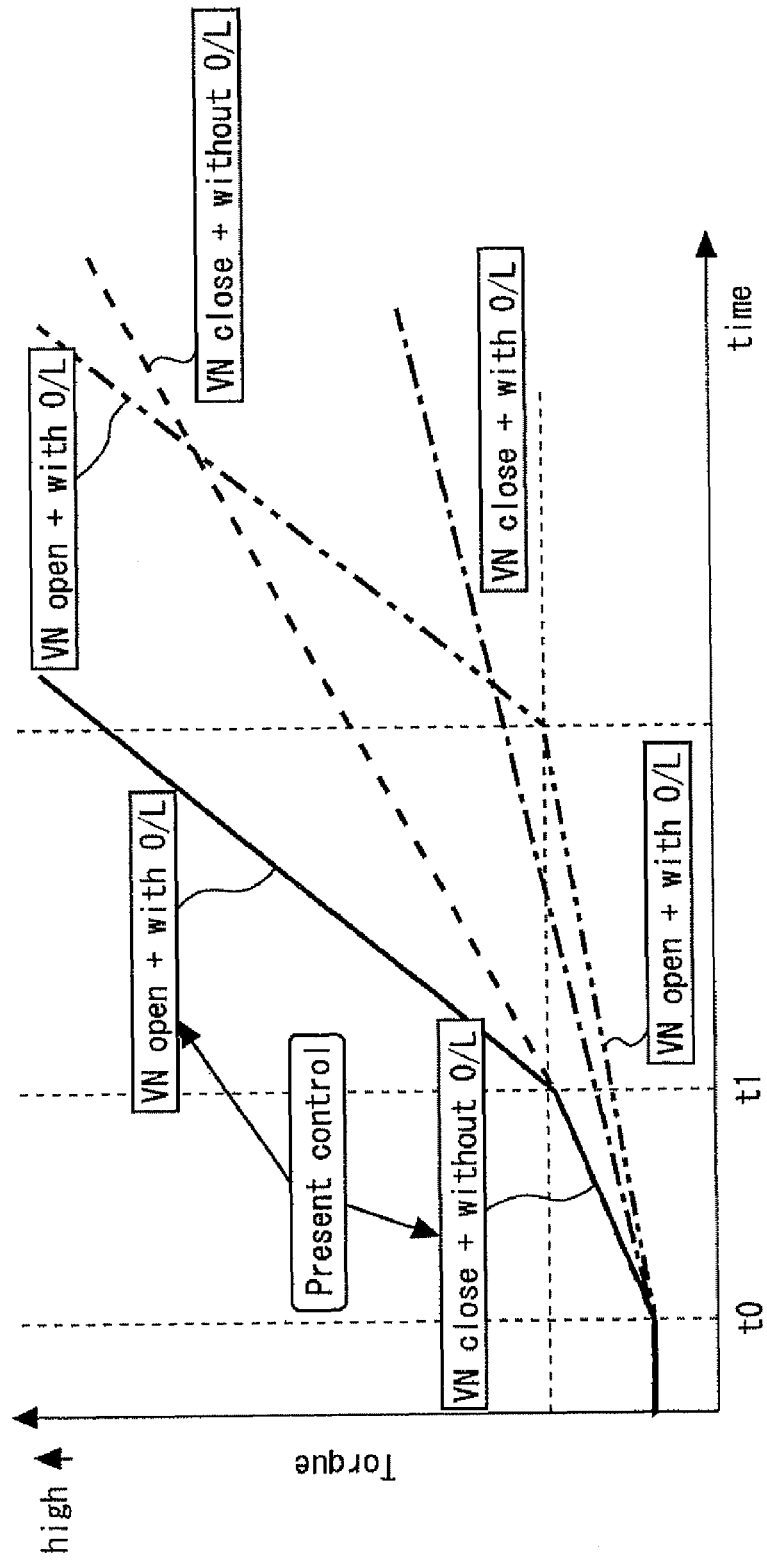
FIG. 4 is a timing chart to illustrate the order of executing the opening degree control of the variable nozzle and the control of valve overlap period during acceleration.

FIG. 4 is a timing chart to illustrate the order of executing the opening degree control of the variable nozzle 22c and the control of valve overlap period during acceleration.

In the system of the present embodiment in order to make it possible to utilize an effective scavenging effect at an early period in the beginning of acceleration, in which a request requiring a strong exhaust pressure pulsation is to be made, in a configuration including the variable nozzle type turbocharger 22 and the variable valve mechanisms 44 and 46 which make the valve overlap period variable, it is preferable to perform the control as described below.

Note that in FIG. 4, the waveform represented by a solid line corresponds to the control of the present embodiment. Moreover, the waveform represented by a broken line corresponds to the control in the case in which the VN opening degree is kept fully closed at the time of acceleration in an internal combustion engine which does not include any adjustment mechanism of the valve overlap period. Further, the waveform represented by an one-dot chain line corresponds to the control in the case in which from the start of acceleration, the VN opening degree is kept fully closed and the valve overlap period is provided. Further, the waveform represented by a two-dot chain line corresponds to the control in the case in which from the start of acceleration, the VN opening degree is kept at a constant opening degree and the valve overlap period is provided.

That is, an arrangement is made as follows: at a time point t0 at which an acceleration request from the driver is detected, the variable nozzle 22c is controlled such that the VN opening degree is fully closed as shown in FIG. 4, and the variable valve mechanisms 44 and 46 are controlled such that the valve overlap period is zero. Then, in a duration until a time point t1 is reached at which the exhaust pressure pulsation can be judged to have become strong, that is, in an initial period of acceleration, the control to make the VN opening degree fully closed and the valve overlap period zero as described above is continued. As a result, the torque of the diesel engine 10 starts going up gradually as shown in FIG. 4.

Thereafter, when the above-described time point t1 at which the exhaust pressure pulsation can be judged to have become strong is reached, the VN opening degree starts to be opened toward a predetermined intermediate opening degree (to be more specific, an opening degree with a high turbo efficiency). On the other hand, the adjustment of the valve overlap period is started at a time point at which it is judged that a condition in which the intake pressure is higher than the exhaust pressure is achieved as a result of the turbo efficiency being improved as the time elapses thereafter. To be more specific, the valve overlap period starts to be expanded so as to overlap with a timing at which the trough of the exhaust pressure pulsation comes.

The control of the present embodiment can achieve an excellent effect as described below with respect to the other controls shown in FIG. 4.

First, the control of the present embodiment (solid line) is compared with the control represented by the broken line. As shown in FIG. 4, since the control represented by the broken line is identical with the control of the present embodiment in an initial stage of acceleration, there is no difference between them. However, while in the control of the present embodiment, the VN opening degree is opened at the time point t1 at which the exhaust pressure pulsation is judged to have become strong and thereafter the valve overlap period is set; in the control represented by the broken line, no valve overlap period remains to be provided even after the above-described time point t1. For this reason, the control represented by the broken line results in that the rise in the torque takes more time relative to the control of the present embodiment due to the lack of utilization of the scavenging effect through the exploitation of an enhanced exhaust pressure pulsation.

Next, the control of the present embodiment (solid line) is compared with the control represented by the one-dot chain line. In the control represented by the one-dot chain line, since, on the grounds that the exhaust pressure pulsation is weak, the valve overlap period is set in an initial stage of acceleration in which the intake pressure does not become higher relative to the exhaust pressure; the volumetric efficiency $\eta v$ is degraded due to a blow-back of the exhaust gas to the intake side. Further, in the control represented by the one-dot chain line, since, as a result of the VN opening degree being kept fully closed even after an intermediate period of acceleration in which the exhaust pressure pulsation becomes strong, turbo efficiency is degraded and the intake pressure cannot be sufficiently raised relative to the exhaust pressure; the scavenging effect becomes harder to achieve and the volumetric efficiency $\eta v$ is degraded due to a blow-back of the exhaust gas to the intake side. For this reason, the control represented by the one-dot chain line also results in that the rise in the torque takes more time and the magnitude of the torque itself cannot be sufficiently raised relative to the control of the present embodiment.

Next, the control of the present embodiment (solid line) is compared with the control represented by the two-dot chain line. In the control represented by the two-dot chain line, as a result of the VN opening degree being kept at a constant opening degree in an initial stage of acceleration, the time period required for the exhaust pressure pulsation to become strong is prolonged compared with the control of the present embodiment. For this reason, the control represented by the two-dot chain line results in that the rise in the torque takes more time relative to the control of the present embodiment due to such delay time in the generation of the exhaust pressure pulsation.

As so far described, according to the control of the present embodiment, an increase in the quantity of intake air can be promoted by controlling the VN opening degree to be fully closed, thereby enhancing the exhaust pressure pulsation at an early period, and thus it becomes possible to utilize the scavenging effect at an early period. Further, as a result of the valve overlap period being set to zero in an initial period of acceleration, it becomes possible to favorably prevent the degradation of the volumetric efficiency $\eta v$ caused by a blow-back of the exhaust gas to the intake side.

Moreover, according to the control of the present embodiment, after an intermediate period of acceleration with an enhanced exhaust pressure pulsation, as a result of the VN 22c being opened to an opening degree with a high turbo efficiency, the exhaust pressure can be decreased relative to the intake pressure (boost pressure), thereby making it possible to sufficiently utilize the scavenging effect. Moreover, it is possible to combine the realization of such scavenging effect and the securement of turbo efficiency.

Further, according to the control of the present embodiment, because of the arrangement that the timing of setting the valve overlap period in an intermediate period of acceleration is after the opening operation of the VN opening degree, it becomes possible to provide the valve overlap period after the area in which the intake pressure becomes higher relative to the exhaust pressure in the vicinity of the exhaust top dead center is securely ensured. As a result of this, it becomes possible to sufficiently utilize the scavenging effect while avoiding the occurrence of a blow-back of the exhaust gas to the intake side.

[Method of Suppressing a Torque Difference in the Beginning of the Utilization of Scavenging Effect]

Figure 5:
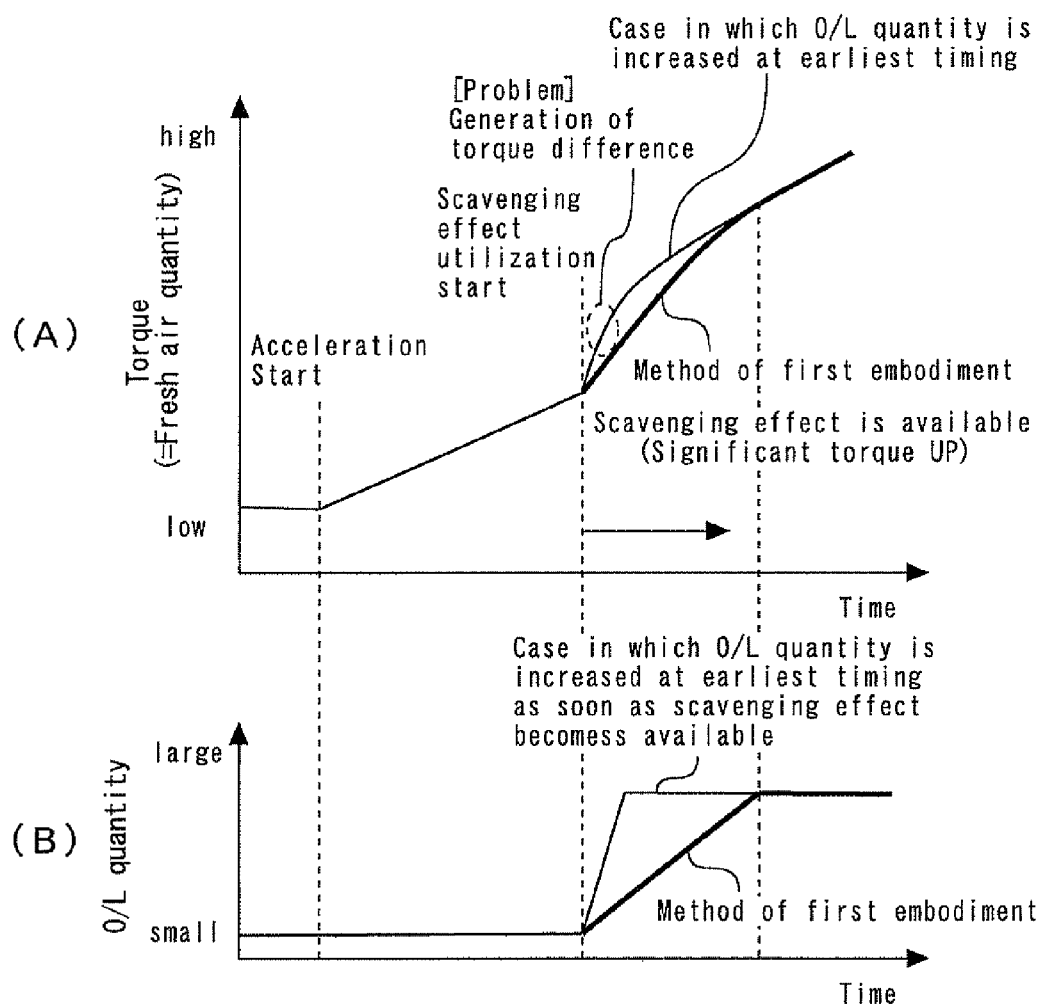
FIG. 5 is a diagram for explaining a problem and its solution in the beginning of the utilization of scavenging effect.

FIG. 5 is a diagram for explaining a problem and its solution in the beginning of the utilization of scavenging effect.

According to the above described control of the present embodiment, the valve overlap period is to be set so as to achieve a scavenging effect after the exhaust pressure pulsation becomes sufficiently strong. As a result, it becomes possible to significantly increase the torque of the diesel engine 10 during acceleration by utilizing the scavenging effect. However, since the fresh air quantity (or torque) significantly increases at the timing of starting the setting of the valve overlap period, there is a concern that a torque difference may occur as the setting of the valve overlap period is started.

To be more specific, when a valve overlap period is set at an earliest timing as soon as the scavenging effect becomes available as represented by the thin line in FIG. 5(B), it cannot be avoided that a torque difference occurs as represented by the thin line in FIG. 5(A). Further, if the valve overlap period is set before the exhaust pressure pulsation becomes sufficiently strong to avoid the occurrence of such a torque difference, the rise in the torque is retarded by a blow-back of gas to the intake side in an initial period of acceleration (see the waveform shown by the one-dot chain line in FIG. 4).

Accordingly, in the present embodiment, an arrangement is made such that when a valve overlap period is set at the time of the judgment that the scavenging effect is available, the increase of fresh air quantity (or torque) associated with the setting of the valve overlap period is predicted and, based on the prediction result, the set value of the valve overlap period is optimized (reduced). To be more specific, when it is judged that the scavenging effect is available, the set value of the valve overlap period is limited such that the increase amount of fresh air quantity associated with the setting of the valve overlap period does not exceed a predetermined permissible value (GnUPmax).

If it is supposed that the above described control is performed, when it is judged that the scavenging effect is available, the set value of the valve overlap period is to be limited, compared to the case in which the setting is made at an earliest timing, as represented by the thick line in FIG. 5(B) such that the increase amount of fresh air quantity associated with the setting of the valve overlap period does not become excessively large. Since this makes it possible to start utilizing the scavenging effect at a necessary and sufficient level, it becomes possible to achieve a good acceleration characteristic while suppressing occurrence of a torque difference as indicated by the thick line in FIG. 5(A).

Figure 6:
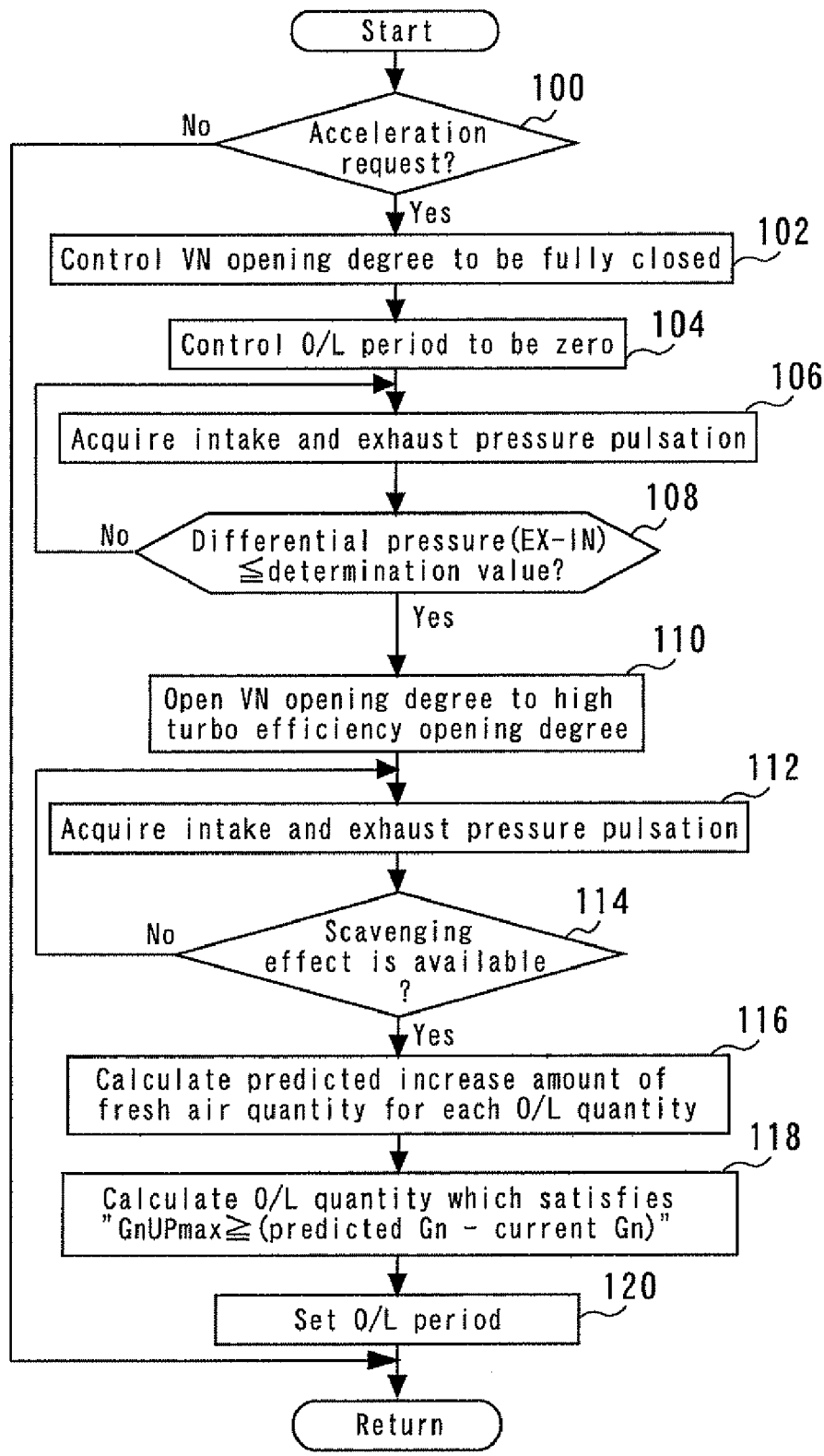
FIG. 6 is a flowchart illustrating a routine that is executed in the first embodiment of the present invention.

FIG. 6 is a flowchart of the routine to be executed by the ECU 58 in the first embodiment to implement the above described function.

In the routine shown in FIG. 6, first, based on the output of the accelerator opening sensor 52, it is determined whether or not an acceleration request for the vehicle (the diesel engine 10) from the driver is present (step 100). As a result, if it is determined that the acceleration request is present, then the opening degree of the variable nozzle (VN) 22c is controlled to become fully closed from an opening degree at the current time (step 102), and the valve overlap period is controlled to become zero from a period at the current time (step 104).

Next, based on the outputs of the intake pressure sensor 54 and the exhaust pressure sensor 56, pulsation waveforms of the intake pressure pulsation and exhaust pressure pulsation are acquired, respectively (step 106). Note that the exhaust pressure pulsation is susceptible, as already described, to the change of the exhaust valve opening timing EVO and the change of the engine speed. Because of this, the pulsation waveform information on the exhaust pressure pulsation may be acquired by referring a map (not shown) which defines the pulsation waveform information between the exhaust valve opening timing EVO and the engine speed, in place of actual measurement by the exhaust pressure sensor 56.

Next, it is determined whether or not the differential pressure between the exhaust pressure and the intake pressure becomes not higher than a predetermined determination value (step 108). This determination value is a predetermined value as a value for judging whether or not the exhaust pressure pulsation becomes sufficiently strong. As a result, while the determination of present step 108 is not positive, the control of making the VN opening degree fully closed and the control of making the valve overlap period zero are to be continued, respectively.

On the other hand, if the determination in above-described step 108 is positive and thus it can be judged that the exhaust pressure pulsation becomes sufficiently strong, then the VN opening degree is opened so as to be an intermediate opening degree which provides an excellent turbo efficiency (step 110). The ECU 58 stores a map (not shown) which defines VN opening degrees with high turbo efficiencies in relation with the operating conditions of the diesel engine 10 such as the engine speed and intake air quantity. In present step 110, with reference to such a map, the VN opening degree is to be opened so as to be an opening degree with a high turbo efficiency in an operating condition after the acceleration request.

Next, an intake pressure pulsation and an exhaust pressure pulsation at the current time are acquired, respectively (step 112). Then, based on the respective pulsation waveforms of the intake pressure pulsation and the exhaust pressure pulsation acquired in present step 112, a determination is made on whether or not a pressure condition in which the scavenging effect can be utilized is established (step 114). To be specific, it is determined if the exhaust pressure has become sufficiently lowered with respect to the intake pressure. As a result of the control by which the VN opening degree is opened to be an opening degree with a high turbo efficiency being performed in above-described step 110, the exhaust pressure starts to decrease. The determination value in present step 114 is a predetermined value as a value for judging whether or not the exhaust pressure pulsation is reduced to the condition in which the scavenging effect described with reference to above-described FIG. 2 can be sufficiently achieved.

As a result, if it is determined that the determination of present step 114 is positive, that is, it can be determined that a pressure condition in which a sufficient scavenging effect can be achieved is fulfilled, then a predicted increase amount of the fresh air quantity Gn for each predetermined O/L quantity is calculated based on a map (not shown) or a model formula which defines the relationship between the O/L quantity and the fresh air quantity Gn (step 116).

Figure 7:
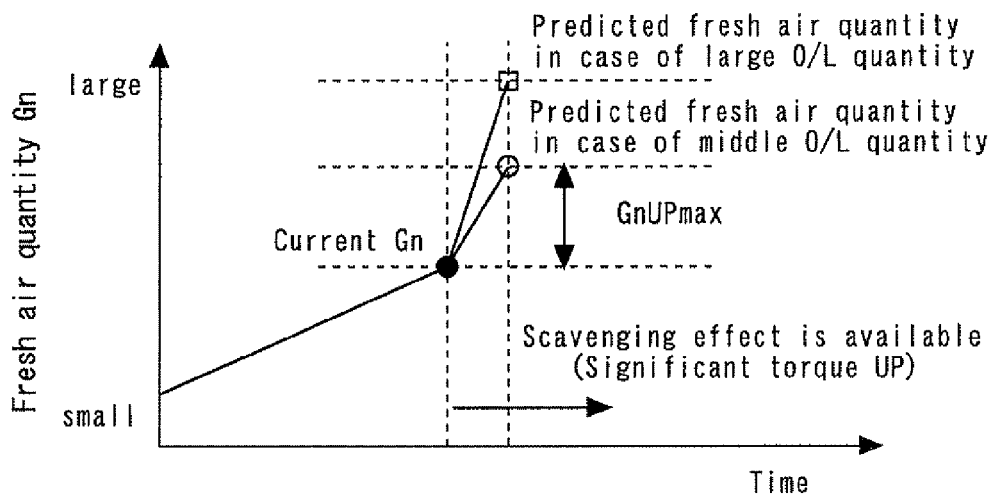
FIG. 7 is a diagram for explaining the relationship between the O/L quantity and the predicted increase amount of fresh air quantity Gn.

Next, an O/L quantity which satisfies the condition that the difference between a predicted increase amount of fresh air quantity Gn and a current fresh air quantity Gn is not more than a permissible maximum value GnUPmax is calculated (step 118). Note that the permissible maximum value GnUPmax is a predetermined value in relation to the operating states (such as the torque and the engine speed) of the diesel engine 10. FIG. 7 is a diagram for explaining the relationship between the O/L quantity and the predicted increase amount of fresh air quantity Gn. As shown in FIG. 7, as the O/L quantity which is set at the time when the scavenging effect becomes available increases, the predicted increase amount of fresh air quantity Gn for current fresh air quantity Gn increases. According to the processing of present step 118, a maximum O/L quantity is determined within a range in which the predicted increase amount of fresh air quantity Gn does not exceed the permissible maximum value GnUPmax. Then, based on the calculated O/L quantity, a positive valve overlap period is set so as to overlap with the timing at which a trough of the exhaust pressure pulsation comes (step 120).

According to the routine shown in FIG. 6 as described so far, when it is judged that the scavenging effect has become available, the set value of the valve overlap period is limited such that the predicted increase amount of the fresh air quantity Gn associated with the setting of the valve overlap period does not exceed the permissible maximum value GnUPmax. Since this makes it possible to start utilizing the scavenging effect at a necessary and sufficient level, it becomes possible to achieve a good acceleration characteristic while suppressing the occurrence of a torque difference.

Further, according to the above described routine, when an acceleration request is made which is an example of requests to increase the exhaust pressure pulsation, first, in an initial period of acceleration, the VN opening degree is controlled to be fully closed and the valve overlap period is controlled to be zero. Thereafter, at the time when it is judged that the exhaust pressure pulsation has become strong, the VN opening degree is opened so as to be an opening degree with a high turbo efficiency. Then, after such opening degree operation of the VN 22c is performed, at the time when it is judged that a pressure condition is obtained in which a sufficient scavenging effect is achieved, a valve overlap period in accordance with the VN opening degree is set. According to the above described processing, it becomes possible to effectively utilize the scavenging effect at an early period after the acceleration request is issued while suppressing a torque difference in the beginning of the utilization of the scavenging effect.

On the other hand, in the first embodiment, which has been described above, description has been made on an example in which a phase variable mechanism is used as the variable valve mechanisms 44, 46 which make the valve opening characteristics of the intake valve and the exhaust valve variable. However, the variable valve mechanism for adjusting the valve overlap period in the present invention is not limited to the above described variable valve mechanisms 44, 46 provided that the mechanism makes at least one of the intake valve opening timing IVO and the exhaust valve closing timing EVC adjustable. That is, besides the above described phase variable mechanism, a mechanical variable valve mechanism (for example, as described in International Publication No. WO2006/132059) which combines: an operating angle variable mechanism which makes the operating angle (and the lift amount) of the intake valve and the exhaust valve continuously variable; and the above described phase variable mechanism may be used, and further a mechanism of driving a cam by an electric motor and electromagnetic valves may be used.

Incidentally, in the first embodiment, which has been described above, the "scavenging effect determination means" according to the first aspect of the present invention is implemented when the ECU 58 executes the processing of above-described step 114; the "overlap period setting means" according to the first aspect of the present invention is implemented when the ECU 58 executes the processing of above-described step 120; and the "overlap period limiting means" according to the first aspect of the present invention is implemented when the ECU 58 executes the processing of above-described steps 116 and 118.

Further, in the first embodiment, which has been described above, the "acceleration request detection means" according to the eighth aspect of the present invention is implemented when the ECU 58 executes the processing of above-described step 100; the "nozzle opening degree control means" according to the eighth aspect of the present invention is implemented when the ECU 58 controls the opening degree of the variable nozzle 22c by giving an instruction to an actuator which is not shown; the "pulsation generation status acquisition means" according to the eighth aspect of the present invention is implemented when the ECU 58 executes the processing of above-described step 108; the "overlap period reduction means" according to the eighth aspect of the present invention is implemented when the ECU 58 executes the processing of above-described step 104; and the "nozzle closing control execution means" according to the eighth aspect of the present invention is implemented when the ECU 58 executes the processing of above-described step 102.

Second Embodiment

Next, A second embodiment of the present invention will be described with reference to FIGS. 8 to 12.

The system of the present embodiment can be implemented by using the hardware configuration shown in FIG. 1 and causing the ECU 58 to execute the routine shown in FIG. 12 described below as well as the routine shown in FIG. 6.

According to the above described system of the first embodiment, when it is judged that the scavenging effect is available, the set value of the valve overlap period is limited such that an increase amount of the fresh air quantity Gn associated with the setting of the valve overlap period does not exceed the permissible maximum value GnUPmax. On the other hand, as already described, the phase of the exhaust pressure pulsation varies in association with the change of the exhaust valve opening timing EVO and the change of the engine speed. The system of the present embodiment is characterized in that when the set value of the valve overlap period is limited, it is determined which of the intake valve opening timing IVO and the exhaust valve closing timing EVC is to be preferentially adjusted, depending on the waveform of the exhaust pressure pulsation.

Figure 8:
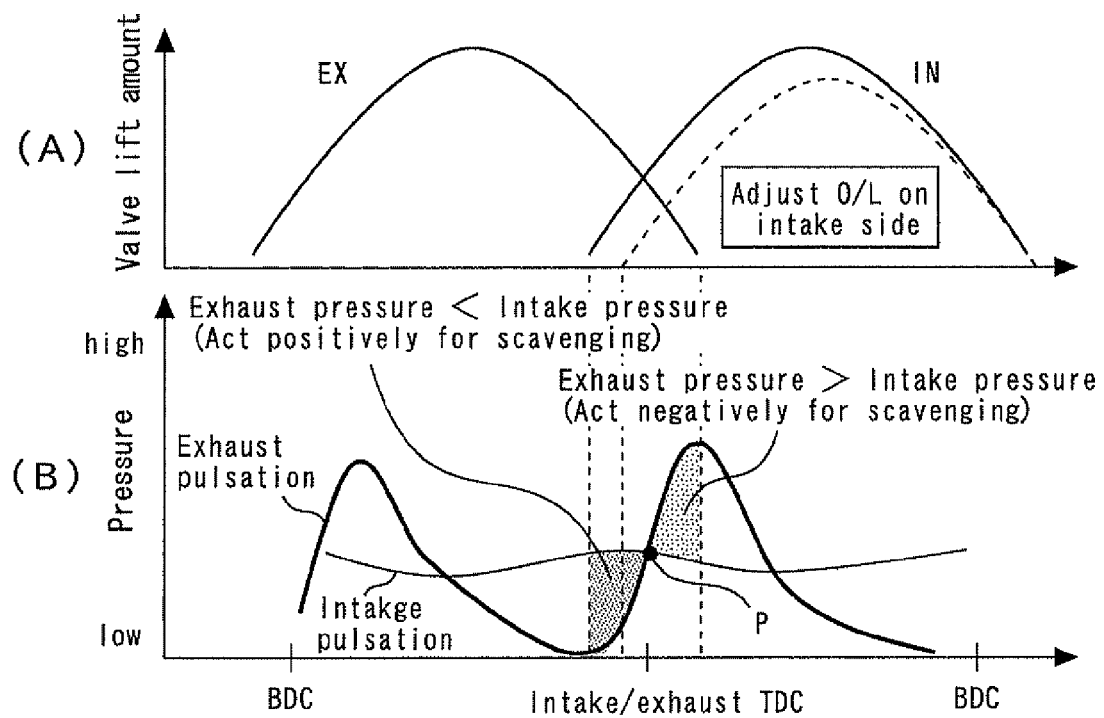
FIG. 8 is a diagram for explaining the control in the case where the area in which the intake pressure is higher than the exhaust pressure lies more to the front side (advance-angle side) of the intake/exhaust top dead center (TDC)

FIG. 8 is a diagram for explaining the control in the case where the area in which the intake pressure is higher than the exhaust pressure lies more to the front side (advance-angle side) of the intake/exhaust top dead center (TDC). To be more specific, FIG. 8(A) shows lift curves of the intake and exhaust valves, and FIG. 8(B) shows waveforms of the intake and exhaust pressure pulsations. Note that the pulsation waveforms shown in FIG. 8(B) shows an example in which the intersection P between the intake pressure and exhaust pressure is located at the intake/exhaust top dead center.

In the pulsation waveforms shown in FIG. 8(B), the area which lies to the front side of the intake/exhaust top dead center (an area in which the exhaust pressure is lower than the intake pressure) is an area which acts positively for scavenging and, on the other hand, the area which lies to the rear side of the intake/exhaust top dead center (an area in which the exhaust pressure is higher than the intake pressure) is an area which acts negatively for scavenging.

Figure 9:
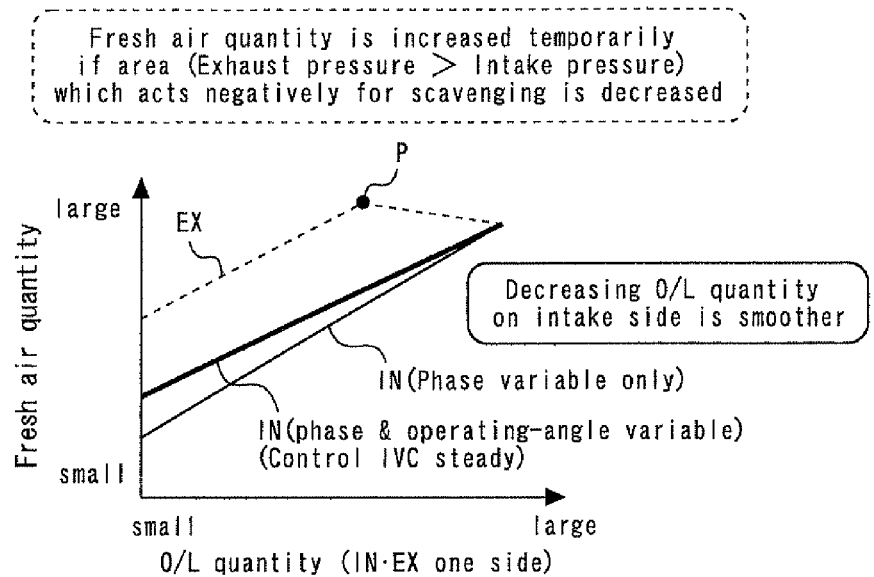
FIG. 9 is a diagram illustrating the relationship between the O/L quantity and the fresh air quantity separately for each of the intake side and the exhaust side, in the case where the area in which the intake pressure is higher than the exhaust pressure lies more to the front side (advance-angle side) of the intake/exhaust top dead center (TDC)

FIG. 9 is a diagram illustrating the relationship between the O/L quantity and the fresh air quantity separately for each of the intake side and the exhaust side, in the case where the area in which the intake pressure is higher than the exhaust pressure lies more to the front side (advance-angle side) of the intake/exhaust top dead center (TDC). Note that the relationship shown in FIG. 9 assumes a case where the area in which the exhaust pressure is lower than the intake pressure lies more to the front side of the intake/exhaust top dead center and the intersection P is present in the rear side of the intake/exhaust top dead center.

Adjusting the O/L quantity using the advance angle of the intake valve opening timing IVO in the case where the area in which the intake pressure is higher than the exhaust pressure lies more to the front side of the intake top dead center results in that as the O/L quantity increases, the range in which the area in which the exhaust pressure is lower than the intake pressure overlaps with the valve overlap period expands. Because of this, as shown by the solid line in FIG. 9, as the O/L quantity increases, the fresh air quantity monotonously increases. Moreover, in the case where an operating angle variable mechanism as well as a phase variable mechanism is provided, since the O/L quantity can be increased with the intake valve closing timing IVC being kept constant, it becomes possible to adjust the O/L quantity while preventing a change in the fresh air quantity associated with a change in the above described closing timing IVC. Because of this, as shown in FIG. 9, in a case (thick line) where an operating angle variable mechanism as well as a phase variable mechanism is provided, it is possible to reduce the change of the fresh air quantity against the change of the O/L quantity, compared with a case (thin line) where only a phase variable mechanism is provided.

On the other hand, if the O/L quantity is adjusted using the retard angle of the exhaust valve closing timing EVC, as O/L quantity increases, the range in which the area in which the exhaust pressure is lower than the intake pressure overlaps with the valve overlap period expands until the intersection P is reached. Because of this, as shown by the broken line in FIG. 9, as the O/L quantity increases, the fresh air quantity increases. However, if the O/L quantity increases exceeding the intersection P, since the area in which the exhaust pressure is higher than the intake pressure, (that is, the area which negatively acts for scavenging) increases, the fresh air quantity decreases.

As so far described with reference to FIG. 9, when the area in which the exhaust pressure is lower than the intake pressure lies more to the front side of the intake/exhaust top dead center, the method to adjust the exhaust valve closing timing EVC is inferior in controllability (not easy to handle) compared with the method to adjust the intake valve opening timing IVO, because a situation may be assumed in which the change of fresh air quantity against the change of the O/L quantity is not monotonous.

Therefore, in the present embodiment, as shown in FIG. 8(A), when the area in which the exhaust pressure is lower than the intake pressure lies more to the front side of the intake/exhaust top dead center, the method of adjusting the O/L quantity using the adjustment of the intake valve opening timing IVO is selected. As a result of this, it is possible to improve the controllability of the fresh air quantity by the adjustment of the O/L quantity.

Figure 10:
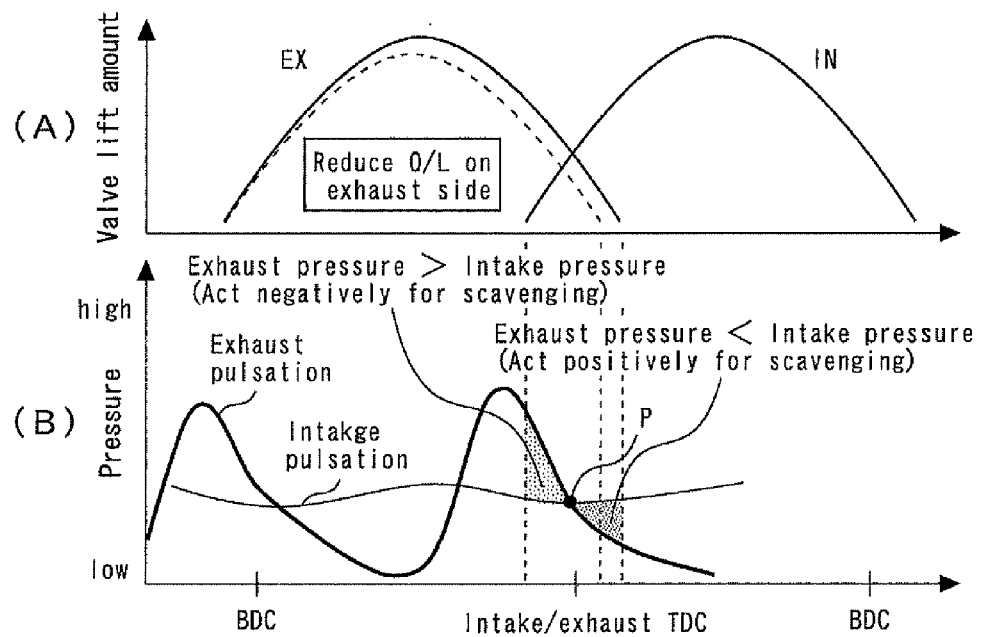
FIG. 10 is a diagram for explaining the control in the case where the area in which the intake pressure is higher than the exhaust pressure lies more to the rear side (retard-angle side) of the intake/exhaust top dead center (TDC)

FIG. 10 is a diagram for explaining the control in the case where the area in which the intake pressure is higher than the exhaust pressure lies more to the rear side (retard-angle side) of the intake/exhaust top dead center (TDC). To be more specific, FIG. 10(A) shows lift curves of the intake and exhaust valves, and FIG. 10(B) shows waveforms of the intake and exhaust pressure pulsations. Note that the pulsation waveforms shown in FIG. 10(B) show an example in which the intersection P between the intake pressure and exhaust pressure is located at the intake/exhaust top dead center.

In the pulsation waveforms shown in FIG. 10(B), the area which lies to the rear side of the intake/exhaust top dead center (an area in which the exhaust pressure is lower than the intake pressure) is an area which acts positively for scavenging and, on the other hand, the area which lies to the front side of the intake/exhaust top dead center (an area in which the exhaust pressure is higher than the intake pressure) is an area which acts negatively for scavenging.

Figure 11:
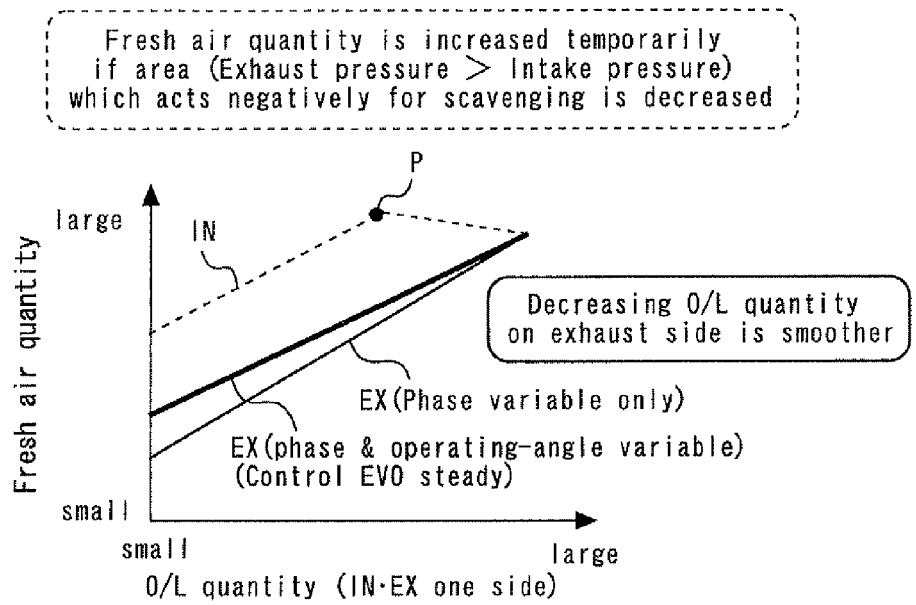
FIG. 11 is a diagram illustrating the relationship between the O/L quantity and the fresh air quantity separately for each of the intake side and the exhaust side, in the case where the area in which the intake pressure is higher than the exhaust pressure lies more to the rear side (retard-angle side) of the intake/exhaust top dead center (TDC)

FIG. 11 is a diagram illustrating the relationship between the O/L quantity and the fresh air quantity separately for each of the intake side and the exhaust side, in the case where the area in which the intake pressure is higher than the exhaust pressure lies more to the rear side (retard-angle side) of the intake/exhaust top dead center (TDC). Note that the relationship shown in FIG. 11 assumes a case where the area in which the exhaust pressure is lower than the intake pressure lies more to the rear side of the intake/exhaust top dead center and the intersection P is present in the front side of the intake/exhaust top dead center.

Adjusting the O/L quantity using the retard angle of exhaust valve closing timing EVC in the case where the area in which the intake pressure is higher than the exhaust pressure lies more to the rear side of the intake/exhaust top dead center results in that as the O/L quantity increases, the range in which the area in which the exhaust pressure is lower than the intake pressure overlaps with the valve overlap period expands. Because of this, as shown by the solid line in FIG. 11, as the O/L quantity increases, the fresh air quantity monotonously increases. Moreover, in the case where an operating angle variable mechanism as well as a phase variable mechanism is provided, since the O/L quantity can be increased with the exhaust valve opening timing EVO being kept constant, it becomes possible to adjust the O/L quantity while preventing a change in the fresh air quantity caused by a phase change of the exhaust pressure pulsation associated with a change in the above described opening timing EVO. Because of this, as shown in FIG. 11, in a case (thick line) where an operating angle variable mechanism as well as a phase variable mechanism is provided, it is possible to reduce the change of the fresh air quantity against the change of the O/L quantity, compared with a case (thin line) where only a phase variable mechanism is provided.

On the other hand, if the O/L quantity is adjusted using the advance angle of the intake valve opening timing IVO, as the O/L quantity increases, the range in which the area in which the exhaust pressure is lower than the intake pressure overlaps with the valve overlap period expands until the intersection P is reached. Because of this, as shown by the broken line in FIG. 11, as the O/L quantity increases, the fresh air quantity increases. However, if the O/L quantity increases exceeding the intersection P, since the area in which the exhaust pressure is higher than the intake pressure, (that is, the area which negatively acts for scavenging) increases, the fresh air quantity decreases.

As so far described with reference to FIG. 11, when the area in which the exhaust pressure is lower than the intake pressure lies more to the rear side of the intake/exhaust top dead center, the method to adjust the intake valve opening timing IVO is inferior in controllability (not easy to handle) compared with the method to adjust the exhaust valve closing timing EVC, because a situation may be assumed in which the change of the fresh air quantity with respect to the change of the O/L quantity is not monotonous.

Therefore, in the present embodiment, as shown in FIG. 10(A), when the area in which the exhaust pressure is lower than the intake pressure lies more to the rear side of the intake/exhaust top dead center, the method of adjusting the O/L quantity using the adjustment of the exhaust valve closing timing EVC is selected. As a result of this, it is possible to improve the controllability of the fresh air quantity by the adjustment of the O/L quantity.

Figure 12:
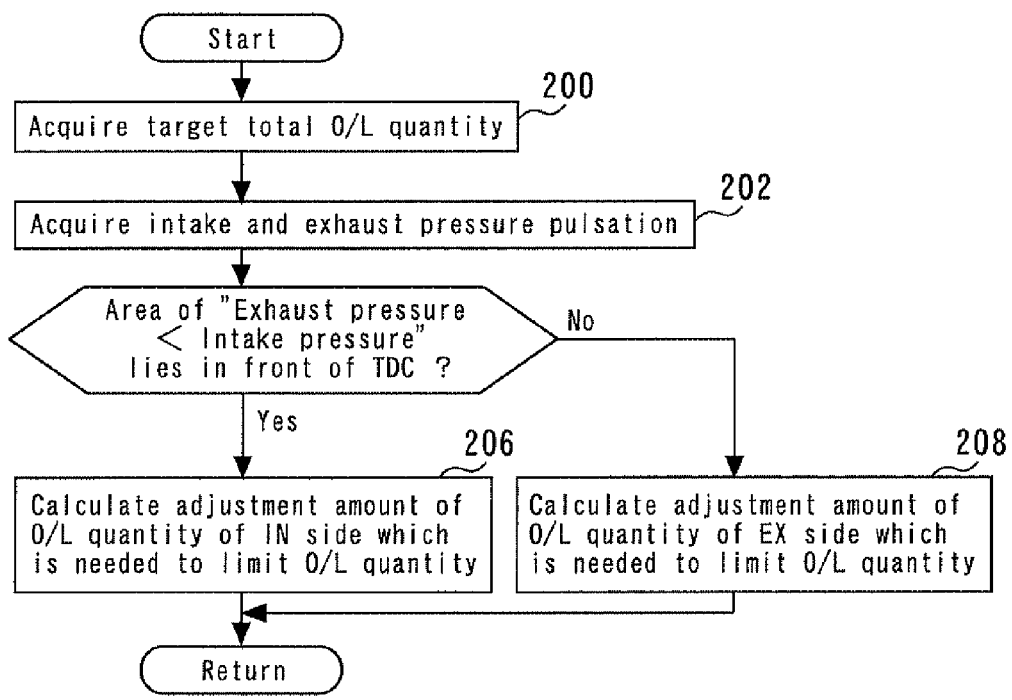
FIG. 12 is a flowchart illustrating a routine that is executed in the second embodiment of the present invention.

FIG. 12 is a flowchart of the routine to be executed by the ECU 58 in the second embodiment, to implement the above described functions. Note that, here, this routine is to be executed between the processing of above-described step 118 and the processing of above-described step 120 in the routine shown in above-described FIG. 6.

In the routine shown in FIG. 12, first a target total O/L quantity is acquired (step 200). This target total O/L quantity is an O/L quantity which is calculated in above-described step 118, and which includes an advance angle of the intake valve opening timing IVO and a retard angle of the exhaust valve closing timing EVC.

Next, pulsation waveforms of the intake pressure pulsation and the exhaust pressure pulsation are acquired (step 202). The acquisition method of the pulsation waveform in present step 202 is similar to the method in above-described step 106. Then, it is determined whether or not the area in which the exhaust pressure is lower than the intake pressure lies more in the front side of the intake/exhaust top dead center, with reference to the acquired pulsation waveforms (step 204).

As a result, when it is determined that the area in which the exhaust pressure is lower than the intake pressure lies more to the front side of the intake/exhaust top dead center, an adjustment amount of the O/L quantity of intake IN side (an advance angle of the intake valve opening timing IVO), which is needed to implement the above described limitation of the O/L quantity, is calculated (step 206). The above described target total O/L quantity is a target set value of the valve overlap period, which is limited such that a predicted increase amount of the fresh air quantity Gn associated with the setting of the valve overlap period does not exceed a permissible maximum value GnUPmax. If present step 206 is selected, the target total O/L quantity which is subjected to the above described limitation is implemented by the adjustment of the O/L quantity of the intake side, and an adjustment amount of the O/L quantity of the intake IN side (an advance angle of the intake valve opening timing IVO), which is needed for that purpose, is calculated.

On the other hand, when the area in which the exhaust pressure is lower than the intake pressure lies more to the rear side of the intake/exhaust top dead center, an adjustment amount of the O/L quantity of the exhaust EX side (a retard angle of the exhaust valve closing timing EVC), which is needed to implement the above described limitation of the O/L quantity is calculated (step 208). That is, if present step 208 is selected, the target total O/L quantity which is subjected to the above described limitation is implemented by the adjustment of the O/L quantity of the exhaust side, and an adjustment amount of the O/L quantity of the exhaust EX side (a retard angle of the exhaust valve closing timing EVC), which is needed for that purpose, is calculated.

According to the above described routine shown in FIG. 12, based on pulsation waveforms, it is to be judged, which is preferable to adjust the O/L quantity either on the intake side or on the exhaust side to ensure a good controllability of the fresh air quantity in the beginning of the utilization of the scavenging effect. Then, either of the intake side or the exhaust side which is judged to be more preferable in controllability is selected and, in addition to that, the set value of the valve overlap period is limited such that a torque difference does not occur. As a result of this, it becomes possible to make the change of fresh air quantity (or torque) due to the adjustment of the O/L quantity gradual (smooth).

Incidentally, in the second embodiment, which has been described above, the "pulsation waveform acquisition means" according to the second aspect of the present invention is implemented when the ECU 58 executes the processing of above-described step 202; and the "valve control determination means" according to the second aspect of the present invention is implemented when the ECU 58 executes the processing of above-described steps 204 to 208.

Third Embodiment

Next, a third embodiment of the present invention will be described with reference to FIGS. 13 to 15.

The system of the present embodiment can be implemented by using the hardware configuration shown in FIG. 1 and causing the ECU 58 to execute the routine shown in FIG. 15 described below as well as the routine shown in FIG. 6. Note that the intake variable valve mechanism of the present embodiment is supposed to be the above described mechanism 44 (that is, a mechanism including only a phase variable mechanism without an operating angle variable mechanism) and the exhaust variable valve mechanism is supposed to be the above described mechanism 46 (that is, a mechanism including only a phase variable mechanism without an operating angle variable mechanism).

Figure 13:
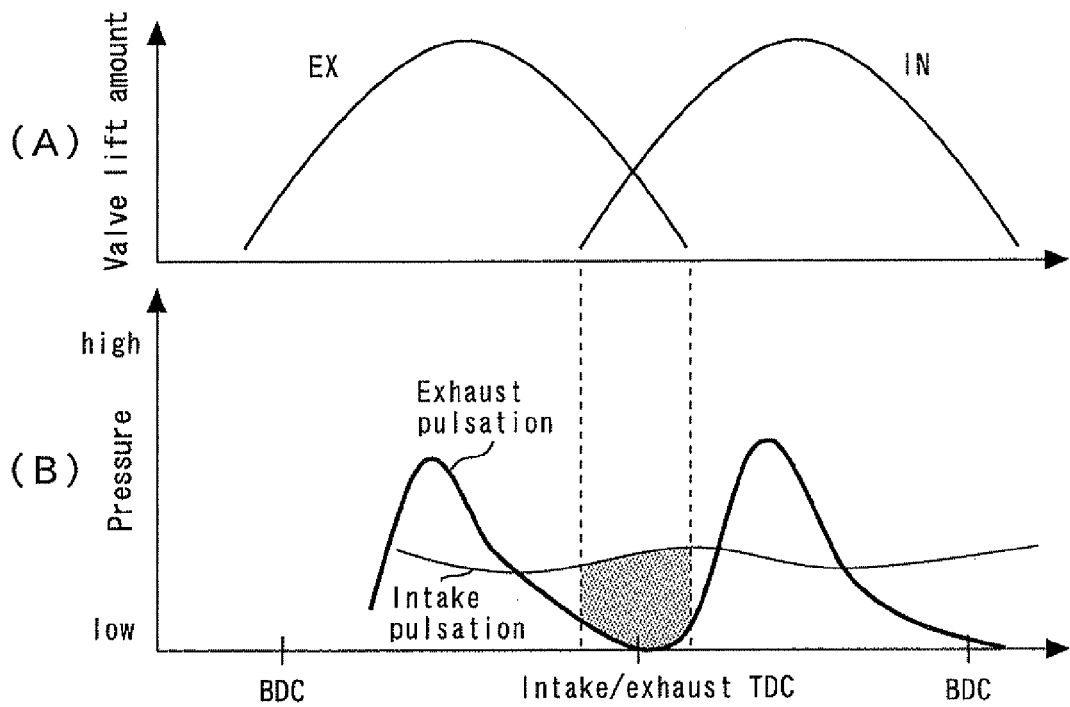
FIG. 13 is a diagram illustrating pulsation waveforms and the valve overlap period in the case where the area in which the exhaust pressure is lower than the intake pressure lies substantially uniformly in the front and rear sides of the intake/exhaust top dead center.

FIG. 13 is a diagram illustrating pulsation waveforms and the valve overlap period in the case where the area in which the exhaust pressure is lower than the intake pressure lies substantially uniformly in the front and rear sides of the intake/exhaust top dead center.

In the second embodiment described above, an arrangement is made such that whether the O/L quantity of the intake side is adjusted or the O/L quantity of the exhaust side is adjusted is selected depending on whether the area in which the exhaust pressure is lower than the intake pressure lies in the front side or in the rear side of the intake/exhaust top dead center. In contrast to this, the present embodiment addresses a control in the case where the area in which the exhaust pressure is lower than the intake pressure lies substantially uniformly in the front and rear sides of the intake/exhaust top dead center.

To be specific, the system of the present embodiment, which includes only a phase variable mechanism on each of the intake side and the exhaust side, is characterized in that when the area in which the exhaust pressure is lower than the intake pressure lies substantially uniformly in the front and rear sides of the intake/exhaust top dead center, the adjustment of intake valve opening timing IVO is utilized when limiting the set value of the valve overlap period.

Figure 14:
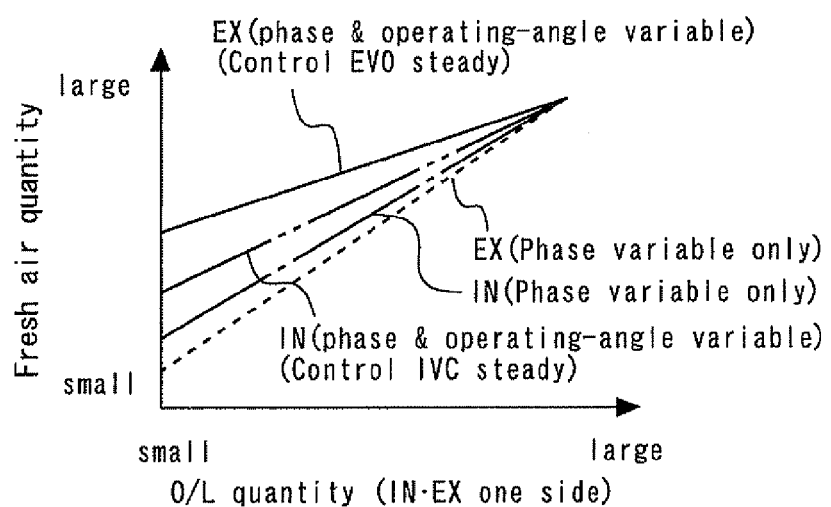
FIG. 14 is a diagram illustrating the relationship between the O/L quantity and the fresh air quantity separately for each of the intake side and the exhaust side, in the case where the area in which the intake pressure is higher than the exhaust pressure lies substantially uniformly in the front and rear sides of the intake/exhaust top dead center.

FIG. 14 is a diagram illustrating the relationship between the O/L quantity and the fresh air quantity separately for each of the intake side and the exhaust side, in the case where the area in which the intake pressure is higher than the exhaust pressure lies substantially uniformly in the front and rear sides of the intake/exhaust top dead center.

In FIG. 14, the waveform indicated by the broken line represents the change of the fresh air quantity when the O/L quantity is adjusted by controlling the exhaust variable valve mechanism 46 which includes only a phase variable mechanism. Further, the waveform indicated by the one-dot chain line represents the change of the fresh air quantity when the O/L quantity is adjusted by controlling the intake variable valve mechanism 44 which includes only a phase variable mechanism. Comparing both cases, it is seen that the slope of the change of the fresh air quantity against the adjustment of the O/L quantity on the exhaust side is larger than the slope of the change of the fresh air quantity against the adjustment of the O/L quantity on the intake side. This is because the phase change of the exhaust pressure pulsation, which is caused by the change of the opening timing EVO associated with a change of the exhaust valve closing timing EVC using the phase variable mechanism, has more effect on the change of the fresh air quantity than the change of the closing timing IVC, which is associated with a change of the intake valve opening timing IVO using the phase variable mechanism.

Figure 15:
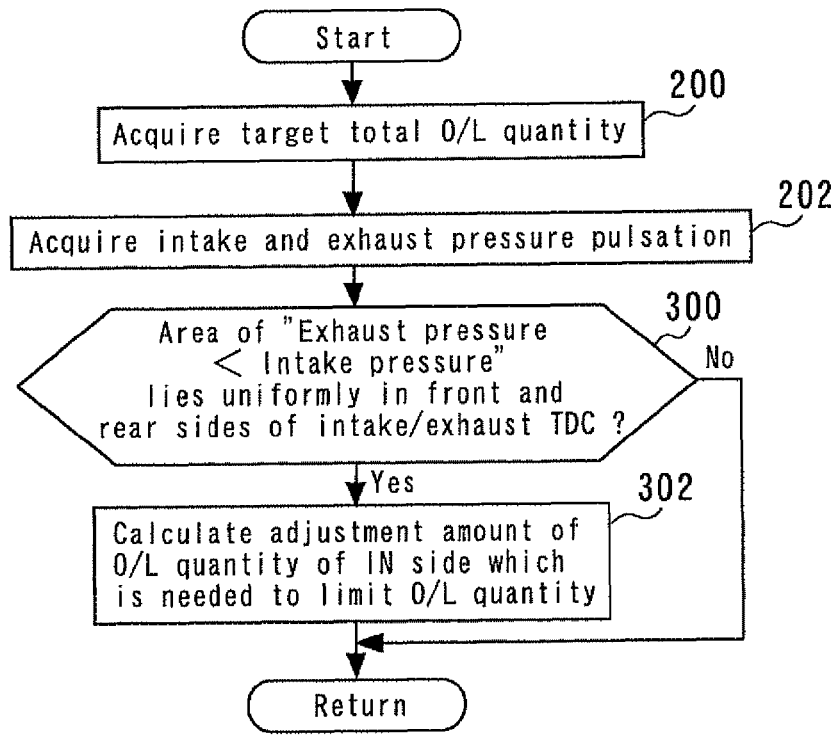
FIG. 15 is a flowchart illustrating a routine that is executed in the third embodiment of the present invention.

FIG. 15 is a flowchart of the routine to be executed by the ECU 58 in the third embodiment, to implement the above described functions. Note that, here, this routine is to be executed between the processing of above-described step 118 and the processing of above-described step 120 in the routine shown in above-described FIG. 6. Further, in FIG. 15, the same steps as those in the second embodiment shown in FIG. 12 are given the same reference numerals to omit or simplify the description thereof.

In the routine shown in FIG. 15, after pulsation waveforms are acquired in above-described step 202, then, it is determined whether or not the area in which the exhaust pressure is lower than the intake pressure lies substantially uniformly in the front and rear sides of the intake/exhaust top dead center based on the acquired pulsation waveforms (step 300). As a result, when this determination is positive, an adjustment amount of the O/L quantity of the intake IN side (an advance angle amount of the intake valve opening timing IVO), which is needed to implement the above described limitation of the O/L quantity, is calculated in the same manner as in above-described step 206 (step 302).

According to the above described routine shown in FIG. 15, in the system of the present embodiment which includes only a phase variable mechanism on both the intake side and the exhaust side, when the area in which the exhaust pressure is lower than the intake pressure lies substantially uniformly in the front and rear sides of the intake/exhaust top dead center, either of the intake side or the exhaust side which is judged to be more preferable in controllability is selected and, in addition to that, the set value of the valve overlap period is limited such that a torque difference does not occur. As a result of this, it becomes possible to make the change in the fresh air quantity (or torque) due to the adjustment of the O/L quantity gradual (smooth).

On the other hand, in the second embodiment, which has been described above, description has been made on, by way of example, a configuration which includes only a phase variable mechanism on each of the intake side and the exhaust side. Also, unlike in such configuration, in a configuration in which an operating angle variable mechanism as well as a phase variable mechanism is provided on the intake side, and only a phase variable mechanism is provided on the exhaust side, if the area in which the exhaust pressure is lower than the intake pressure lies substantially uniformly in the front and rear sides of the intake/exhaust top dead center, it is preferable to utilize the adjustment of the intake valve opening timing IVO when limiting the set amount of the valve overlap period. Further, when an operating angle variable mechanism as well as a phase variable mechanism is provided on the intake side as described above, an arrangement is made such that the O/L quantity is adjusted by the adjustment of the intake valve opening timing IVO with intake valve closing timing IVC being controlled to be constant. This makes it possible, as represented by the two-dot chain line in FIG. 14, to make the change of the fresh air quantity (or torque) with respect to the adjustment of the O/L quantity more gradual, compared with a configuration in which only a phase variable mechanism is provided on the intake side.

Fourth Embodiment

Next, a fourth embodiment of the present invention will be described with reference to FIG. 16 as well as above-described FIG. 14.

The system of the present embodiment can be implemented by using the hardware configuration shown in FIG. 1 and causing the ECU 58 to execute the routine shown in FIG. 16 described below as well as the routine shown in FIG. 6. Note that the intake variable valve mechanism of the present embodiment is supposed to be the above described mechanism 44 (that is, a mechanism including only a phase variable mechanism without an operating angle variable mechanism), while the exhaust variable valve mechanism is supposed to include an operating angle variable mechanism as well as a phase variable mechanism.

The system of the present embodiment, as in the third embodiment described above, also addresses a control in the case where the area in which the exhaust pressure is lower than the intake pressure lies substantially uniformly in the front and rear sides of the intake/exhaust top dead center. Further, the system of the present embodiment, which includes only a phase variable mechanism on the intake side and includes an operating angle variable mechanism as well as a phase variable mechanism on the exhaust side, is characterized in that when the area in which the exhaust pressure is lower than the intake pressure lies substantially uniformly in the front and rear sides of the intake/exhaust top dead center, the adjustment of the exhaust valve closing timing EVC is utilized when limiting the set value of the valve overlap period, unlike the third embodiment described above.

In FIG. 14, the waveform indicated by the solid line represents the change of the fresh air quantity when the O/L quantity is adjusted by controlling the exhaust variable valve mechanism including an operating angle variable mechanism as well as a phase variable mechanism. According to the method, in which an operating angle variable mechanism is provided as well, and the adjustment of the O/L quantity is performed on the exhaust side, it becomes possible to adjust the exhaust valve closing timing EVC while keeping the exhaust valve opening timing EVO constant. This makes it possible to prevent a change in the fresh air quantity caused by the change of the exhaust pressure pulsation associated with a change of the exhaust valve opening timing EVO. Further, since the adjustment of the O/L quantity is not performed on the intake side, it is possible to prevent a change of the fresh air quantity associated with a change of the opening and closing timing of the intake valve. As a result, in the case where the O/L quantity is adjusted by changing the opening and closing timing of the intake and exhaust valve, as shown in FIG. 14, it becomes possible to make the change of the fresh air quantity against the adjustment of the O/L quantity most gradual (smooth).

Figure 16:
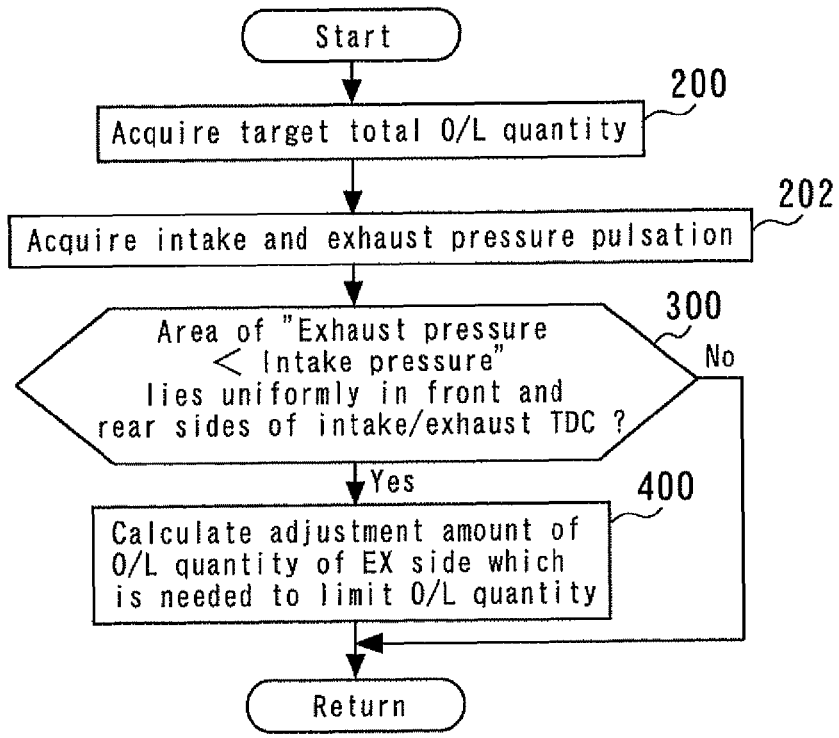
FIG. 16 is a flowchart illustrating a routine that is executed in the fourth embodiment of the present invention.

FIG. 16 is a flowchart of the routine to be executed by the ECU 58 in the fourth embodiment to implement the above described functions. Note that, here, this routine is to be executed between the processing of above-described step 118 and the processing of above-described step 120 in the routine shown in above-described FIG. 6. Further, in FIG. 16, the same steps as those in the second embodiment shown in FIG. 12 and in the third embodiment shown in FIG. 15 are given the same reference numerals to omit or simplify the description thereof.

In the routine shown in FIG. 16, after pulsation waveforms are acquired in above-described step 202, then, it is determined whether or not the area in which the exhaust pressure is lower than the intake pressure lies substantially uniformly in the front and rear sides of the intake/exhaust top dead center, based on the acquired pulsation waveforms (step 300). As a result, when this determination is positive, an adjustment amount of the O/L quantity of the exhaust EX side (an advance angle amount of the exhaust valve closing timing EVC), which is needed to implement the above described limitation of the O/L quantity is calculated in the same manner as in above-described step 208 (step 400). Note that in this case, the exhaust valve opening timing EVO is made constant.

According to the above described routine shown in FIG. 16, in the system of the present embodiment which includes only a phase variable mechanism on the intake side and an operating angle variable mechanism as well as a phase variable mechanism on the exhaust side, when the area in which the exhaust pressure is lower than the intake pressure lies substantially uniformly in the front and rear sides of the intake/exhaust top dead center, either of the intake side or the exhaust side which is judged to be more preferable in controllability is selected and, in addition to that, the set value of the valve overlap period is limited such that a torque difference does not occur. As a result of this, it becomes possible to make the change in the fresh air quantity (or torque) due to the adjustment of the O/L quantity gradual (smooth).

Fifth Embodiment

Next, a fifth embodiment of the present invention will be described with reference to above-described FIGS. 14 and 16.

The system of the present embodiment can be implemented by using the hardware configuration shown in FIG. 1 and causing the ECU 58 to execute the routine shown in FIG. 16 described below as well as the routine shown in FIG. 6. Note that the variable valve mechanism of the present embodiment is supposed to include an operating angle variable mechanism, which involves a change in a lift amount, as well as a phase variable mechanism on the intake side, and include an operating angle variable mechanism (regardless of whether or not a change in the lift amount is involved) as well as a phase variable mechanism on the exhaust side.

The system of the present embodiment, as in the third and fourth embodiments described above, also addresses a control in the case where the area in which the exhaust pressure is lower than the intake pressure lies substantially uniformly in the front and rear sides of the intake/exhaust top dead center. Further, in the present embodiment, which includes an operating angle variable mechanism, which involves a change in the lift amount, as well as a phase variable mechanism on the intake side, and include an operating angle variable mechanism as well as a phase variable mechanism on the exhaust side, as with the fourth embodiment described above, when limiting the set value of the valve overlap period in the case where the area in which the exhaust pressure is lower than the intake pressure lies substantially uniformly in the front and rear sides of the intake/exhaust top dead center, the adjustment of the exhaust valve closing timing EVC is utilized.

When the system includes an operating angle variable mechanism, which involves a change in the lift amount, as well as a phase variable mechanism on the intake side, and include an operating angle variable mechanism as well as a phase variable mechanism on the exhaust side, it is possible to adjust the exhaust valve closing timing EVC while making the exhaust valve opening timing EVO constant, and is also possible to adjust the intake valve opening timing IVO while making the intake valve closing timing IVC constant. However, in a case such as the present embodiment in which the operating angle variable mechanism on the exhaust side involves a change in the lift amount when the operating angle is changed, it cannot be avoided that a change in the lift amount of the intake valve occurs when adjusting the intake valve opening timing IVO of the intake valve while making the intake valve closing timing IVC constant. Further, even if the operating angle variable mechanism on the exhaust side is a mechanism which involves a change in the lift amount, the effect of the change in the lift amount of the intake valve on the fresh air quantity is larger than the effect of the change in the lift amount of the exhaust valve on the fresh air quantity.

Accordingly, the present embodiment utilizes the adjustment of the exhaust valve closing timing EVC. Since the concrete processing to implement such functions is the same as the routine shown in above-described FIG. 16, detailed description thereof is omitted here. According to the method of the present embodiment as described so far, as shown in FIG. 14, in the same manner as in executing the method of the fourth embodiment described above, it becomes possible to make the change in the fresh air quantity against the adjustment of the O/L quantity most gradual (smooth).

On the other hand, in the first to fifth embodiments, which has been described above, description has been made taking an example of the fresh air quantity as a torque index value in the present invention, this torque index value, which may be any index of the torque of an internal combustion engine, may be, for example, a volumetric efficiency or charging efficiency of intake air, other than a fresh air quantity.

Further, in the second to fifth embodiments, which has been described above, description has been made on an example in which waveforms of both the intake pressure pulsation and the exhaust pressure pulsation are acquired and utilized as pulsation waveform information. However, as already described, the exhaust pressure pulsation is generally larger than the intake pressure pulsation. Because of this, in the present invention, it may be arranged such that pulsation waveform information on at least exhaust pressure pulsation of exhaust pressure pulsation and intake pressure pulsation is acquired and utilized.

The invention claimed is:

1. A control apparatus for an internal combustion engine, the control apparatus comprising:
    a variable valve mechanism which makes variable a valve overlap period in which an intake valve open period overlaps with an exhaust valve open period;
    scavenging effect determination means for determining whether or not a scavenging effect utilization condition in which a scavenging effect using an exhaust pressure pulsation can be effectively utilized is established; and
    overlap period setting means which controls the variable valve mechanism to set a valve overlap period so as to overlap with a timing at which a trough of the exhaust pressure pulsation comes, after the scavenging effect utilization condition is established;
    wherein the overlap period setting means includes overlap period limiting means which limits a set value of the valve overlap period such that an increase amount of a torque index value associated with the setting of the valve overlap period does not exceed a predetermined permissible value.

2. The control apparatus for the internal combustion engine according to claim 1, the control apparatus further comprising:
    pulsation waveform acquisition means for acquiring pulsation waveform information on at least the exhaust pressure pulsation of the exhaust pressure pulsation and an intake pressure pulsation;
    wherein the overlap period limiting means includes valve control decision means which decides which of an intake valve opening timing and an exhaust valve closing timing is to be adjusted based on the pulsation waveform information, when limiting the set value of the valve overlap period.

3. The control apparatus for the internal combustion engine according to claim 2,
    wherein the valve control decision means decides to adjust the intake valve opening timing when limiting the set value of the valve overlap period, if an area in which intake pressure is higher than exhaust pressure lies more to a front side of an intake/exhaust top dead center.

4. The control apparatus for the internal combustion engine according to claim 2,
    wherein the valve control decision means decides to adjust the exhaust valve closing timing when limiting the set value of the valve overlap period, if an area in which intake pressure is higher than exhaust pressure lies more to a rear side of an intake/exhaust top dead center.

5. The control apparatus for the internal combustion engine according to claim 2,
    wherein the variable valve mechanism includes an intake variable valve mechanism which makes the intake valve opening timing variable while making an operating angle fixed or variable, and an exhaust variable valve mechanism which makes the exhaust valve closing timing variable while making the operating angle fixed; and
    wherein the valve control decision means decides to adjust the intake valve opening timing when limiting the set value of the valve overlap period, if an area in which intake pressure is higher than exhaust pressure lies substantially uniformly in a front and rear sides of an intake/exhaust top dead center.

6. The control apparatus for the internal combustion engine according to claim 2,
    wherein the variable valve mechanism includes an intake variable valve mechanism which makes the intake valve opening timing variable while making an operating angle fixed, and an exhaust variable valve mechanism which makes the exhaust valve closing timing variable while making the operating angle variable; and
    wherein the valve control decision means decides to adjust the exhaust valve closing timing when limiting the set value of the valve overlap period, when an area in which intake pressure is higher than exhaust pressure lies substantially uniformly in a front and rear sides of an intake/exhaust top dead center.

7. The control apparatus for the internal combustion engine according to claim 2,
    wherein the variable valve mechanism includes an intake variable valve mechanism which makes the intake valve opening timing variable while making an operating angle and a lift angle variable, and an exhaust variable valve mechanism which makes the exhaust valve closing timing variable while making the operating angle variable; and
    wherein the valve control decision means decides to adjust the exhaust valve closing timing when limiting the set value of the valve overlap period, if an area in which intake pressure is higher than exhaust pressure lies substantially uniformly in a front and rear sides of an intake/exhaust top dead center.

8. The control apparatus for the internal combustion engine according to claim 1, the control apparatus further comprising:
- acceleration request detection means for detecting existence or nonexistence of an acceleration request for the internal combustion engine;
- a turbocharger which includes: a turbine which is driven by exhaust energy of internal combustion engine; and a variable nozzle which adjusts a flow rate of exhaust gas supplied to the turbine;
- nozzle opening degree control means for controlling an opening degree of the variable nozzle;
- pulsation generation state acquisition means for acquiring a judgment time point at which exhaust pressure pulsation is judged to have been enhanced, or a prediction time point at which exhaust pressure pulsation is predicted to be enhanced; and
- overlap period reduction means for controlling the value overlap period to be shorter than the valve overlap period at the detection time point, for a duration from the detection time point, at which the acceleration request is detected, to the judgment time point or the prediction time point;
- wherein the nozzle opening degree control means includes nozzle closing control execution means for controlling the opening degree of the variable nozzle to be a predetermined opening degree which is on a closing side with respect to the opening degree of the variable nozzle at the detection time point, for the duration from the detection time point to the judgment time point or the prediction time point.

9. A control apparatus for an internal combustion engine, the control apparatus comprising:
- a variable valve mechanism which makes variable a valve overlap period in which an intake valve open period overlaps with an exhaust valve open period;
- a scavenging effect determination device for determining whether or not a scavenging effect utilization condition in which a scavenging effect using an exhaust pressure pulsation can be effectively utilized is established; and
- an overlap period setting device which controls the variable valve mechanism to set a valve overlap period so as to overlap with a timing at which a trough of the exhaust pressure pulsation comes, after the scavenging effect utilization condition is established;
- wherein the overlap period setting device includes an overlap period limiting device which limits a set value of the valve overlap period such that an increase amount of a torque index value associated with the setting of the valve overlap period does not exceed a predetermined permissible value.

* * * * *